United States Patent
McNew et al.

(10) Patent No.: US 10,657,811 B2
(45) Date of Patent: May 19, 2020

(54) TRAVEL LANE IDENTIFICATION WITHOUT ROAD CURVATURE DATA

(71) Applicant: Toyota Motor Engineering & Manufacturing North America, Inc., Erlanger, KY (US)

(72) Inventors: John-Michael McNew, Ann Arbor, MI (US); Miles J. Johnson, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 289 days.

(21) Appl. No.: 15/724,630

(22) Filed: Oct. 4, 2017

(65) Prior Publication Data

US 2019/0103023 A1 Apr. 4, 2019

(51) Int. Cl.
| | | |
|---|---|---|
| *G08G 1/0962* | (2006.01) | |
| *G01S 19/49* | (2010.01) | |
| *G08G 1/01* | (2006.01) | |
| *G06K 9/00* | (2006.01) | |
| *B60W 30/00* | (2006.01) | |

(Continued)

(52) U.S. Cl.
CPC ........... *G08G 1/0962* (2013.01); *B60W 30/00* (2013.01); *B60W 40/00* (2013.01); *G01C 21/3626* (2013.01); *G01S 19/49* (2013.01); *G06K 9/00798* (2013.01); *G08G 1/012* (2013.01); *G08G 1/0112* (2013.01)

(58) Field of Classification Search
CPC ....... B60W 30/00; B60W 40/00; G01C 21/34; G01C 21/28; G01S 13/931; G01S 15/931; G01S 19/49; G01S 13/862; G01S 13/865; G08G 1/0112; G08G 1/0962; G08G 1/012

See application file for complete search history.

(56) References Cited

U.S. PATENT DOCUMENTS

| | | |
|---|---|---|
| 6,107,939 A | 8/2000 | Sorden |
| 6,292,752 B1 | 9/2001 | Franke et al. |

(Continued)

FOREIGN PATENT DOCUMENTS

DE   10118265 A1   4/2001

OTHER PUBLICATIONS

Popescu et al., "A Lane Assessment Method Using Visual Information Based on a Dynamic Bayesian Network", Journal of Intelligent Transportation Systems, 2015, pp. 225-239, vol. 19, No. 3 (15 pages).

*Primary Examiner* — Mussa A Shaawat
(74) *Attorney, Agent, or Firm* — Christopher G. Darrow; Darrow Mustafa PC

(57) ABSTRACT

One or more dynamic leading objects can be detected in an external environment of a vehicle. The dynamic leading object(s) can be tracked by acquiring position data of the dynamic leading object(s) over time. When it is determined whether a current position of the ego vehicle is at substantially the same longitudinal position as one of the dynamic leading objects at a prior time based on the acquired position data of the dynamic leading object, a lateral offset between the current position of the ego vehicle and the previous position of the dynamic leading object can be determined. The lateral offset can be used to identify a current travel lane of the ego vehicle, determine lane crossings, and/or determine travel lane probability distributions.

25 Claims, 10 Drawing Sheets

(51) Int. Cl.
  *G01C 21/36* (2006.01)
  *B60W 40/00* (2006.01)

(56) References Cited

U.S. PATENT DOCUMENTS

| | | | |
|---|---|---|---|
| 6,853,906 | B1 | 2/2005 | Michi et al. |
| 9,460,624 | B2 | 10/2016 | Pandita et al. |
| 10,156,850 | B1* | 12/2018 | Ansari .................. G08G 1/166 |
| 2003/0156015 | A1 | 8/2003 | Winner et al. |
| 2006/0212215 | A1* | 9/2006 | Koulinitch ............. G06T 7/564 |
| | | | 701/96 |
| 2007/0043506 | A1 | 2/2007 | Mudalige et al. |
| 2011/0215947 | A1* | 9/2011 | Ekmark ................ G08G 1/163 |
| | | | 340/902 |
| 2011/0285571 | A1* | 11/2011 | Jeong .................... G01S 7/4026 |
| | | | 342/27 |
| 2012/0025969 | A1* | 2/2012 | Dozza ..................... B60Q 1/44 |
| | | | 340/463 |
| 2012/0221168 | A1* | 8/2012 | Zeng ................. G08G 1/09626 |
| | | | 701/1 |
| 2012/0271540 | A1 | 10/2012 | Miksa et al. |
| 2014/0222280 | A1 | 8/2014 | Salomonsson et al. |
| 2014/0257686 | A1* | 9/2014 | Feldman ................. G06F 17/00 |
| | | | 701/300 |
| 2015/0025789 | A1 | 1/2015 | Einecke et al. |
| 2015/0032369 | A1* | 1/2015 | Schmidt ................... B60Q 9/00 |
| | | | 701/467 |
| 2015/0325127 | A1 | 11/2015 | Pandita et al. |
| 2016/0229395 | A1* | 8/2016 | Schmudderich ....... G08G 1/162 |
| 2017/0060136 | A1* | 3/2017 | Kobayashi ......... G06K 9/00798 |
| 2017/0106861 | A1 | 4/2017 | Oh et al. |
| 2017/0154225 | A1* | 6/2017 | Stein ..................... B60W 30/16 |
| 2017/0248957 | A1* | 8/2017 | Delp ..................... B60W 30/00 |
| 2017/0277188 | A1* | 9/2017 | Xu ........................ G05D 1/024 |
| 2018/0370528 | A1* | 12/2018 | Rittger ................. B60W 30/09 |
| 2019/0023268 | A1* | 1/2019 | Pink ..................... B60W 30/08 |
| 2019/0210604 | A1 | 7/2019 | Limbacher |
| 2019/0263395 | A1 | 8/2019 | Hoetzer et al. |

\* cited by examiner

TRAVEL LANE IDENTIFICATION WITHOUT ROAD CURVATURE DATA

FIELD

The subject matter described herein relates in general to vehicles and, more particularly, to travel lane identification for vehicles.

BACKGROUND

When being operated on a road that has a plurality of travel lanes, some vehicles can identify which lane they are currently located in by detecting lane markers to the left side and the right side of the vehicle. For example, where a vehicle is in the rightmost lane, there will be a solid lane marker on the right side of the vehicle and a dashed lane marker on the left side of the vehicle. Based on this information, the vehicle would be able to determine that it is located in the rightmost lane of the road. However, if there are more than three lanes on a road, the vehicle cannot determine which lane it is located in when in any of the center lanes because there will be dashed lane markers on both the left and right side of the vehicle. Further, in some instances, there may be portions of a road in which lane markers are not present or cannot otherwise be detected. As a result, the vehicle would not be able to identify its current lane.

SUMMARY

In one respect, the subject matter presented herein is directed to a method of identifying a current travel lane for an ego vehicle. The method can include detecting a dynamic leading object in an external environment of the ego vehicle. The method can include acquiring position data of the dynamic leading object over time. The method can include determining a current position of the ego vehicle. The method can include determining whether the current position of the ego vehicle is at substantially the same longitudinal position as a previous position of the dynamic leading object based on the acquired position data of the dynamic leading object. The method can include, responsive to determining that the current position of the ego vehicle is at substantially the same longitudinal position as a previous position of the dynamic leading object, determining a lateral offset between the current position of the ego vehicle and the previous position of the dynamic leading object. The determined lateral offset can be used for various purposes, including, for example, to identify a current travel lane of the ego vehicle, determine whether ego vehicle has crossed travel lanes, and/or determine a probability that the ego vehicle is located in a particular travel lane.

In another respect, the subject matter presented herein is directed to a system. The system can include a sensor system. The sensor system can include one or more sensors configured to acquire sensor data of at least a forward portion of an external environment of an ego vehicle. The sensor system can include one or more sensors configured to acquire position data of a dynamic leading object over time. The sensor system can include one or more sensors configured to determine a current position of the ego vehicle. The system can include a processor operatively connected to the sensor system. The processor can be programmed to initiate executable operations. The executable operations can include detecting a dynamic leading object in an external environment of the ego vehicle. The executable operations can include tracking a path of the dynamic leading object using acquired position data of the dynamic leading object acquired over time. The executable operations can include determining whether the current position of the ego vehicle is at substantially the same longitudinal position as a previous position of the dynamic leading object based on the acquired position data of the dynamic leading object. The executable operations can include, responsive to determining that the current position of the ego vehicle is at substantially the same longitudinal position as a previous position of the dynamic leading object, determining a lateral offset between the current position of the ego vehicle and the previous position of the dynamic leading object. The determined lateral offset can be used for various purposes, including, for example, to identify a current travel lane of the ego vehicle, determine whether ego vehicle has crossed travel lanes, and/or determine a probability that the ego vehicle is located in a particular travel lane.

DETAILED DESCRIPTION

Figure 1:
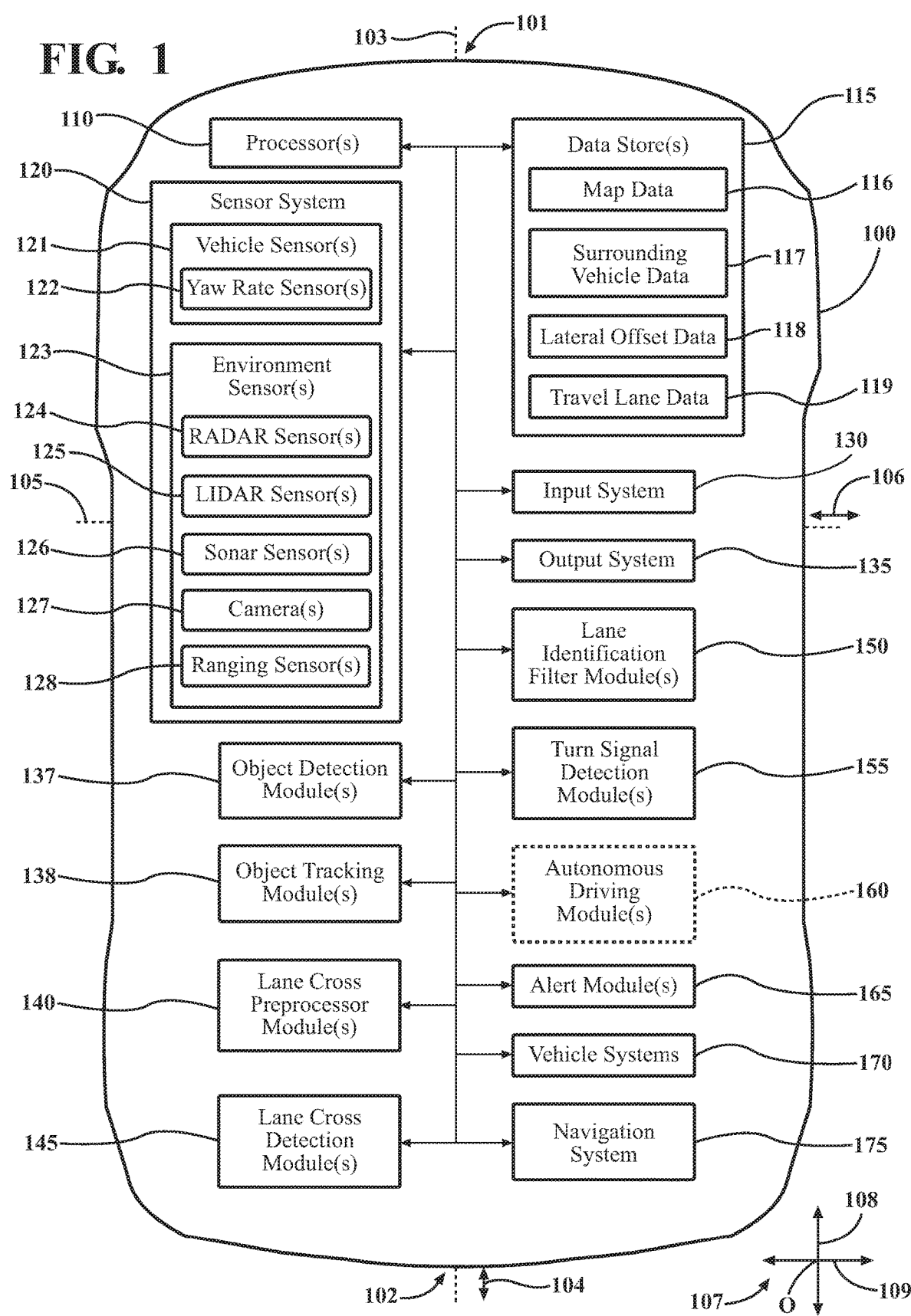
FIG. 1 is an example of an ego vehicle.

This detailed description relates to travel lane identification for a vehicle without using road curvature information. To facilitate this description, a vehicle configured to identify a travel lane in such a manner will be referred to as an "ego vehicle." The travel lane can be identified by using information about surrounding objects and, more particularly, surrounding vehicles (e.g., one or more leading vehicles). As used herein, "surrounding vehicle" or "surrounding object" means a vehicle or object located within the sensor range of the ego vehicle. "Leading vehicle" or "leading object" means a vehicle or object that is located ahead of a point of reference of an ego vehicle in the travel direction of the ego vehicle. The point of reference can be defined by any suitable portion of the ego vehicle. Example of the point of reference can be the forward-most point of the ego vehicle, a rearward-most point of the ego vehicle, a front axle of the ego vehicle, a rear axle of the ego vehicle, a front bumper of the ego vehicle, a rear bumper of the ego vehicle, a midpoint of the ego vehicle, or the location of one or more sensors of the ego vehicle.

One or more dynamic leading objects can be detected in an external environment of the ego vehicle. "Dynamic object" means an object that is moving in one or more directions. Position data of the dynamic leading object(s) can be acquired over time. It can be determined whether a current position of the ego vehicle is at substantially the same longitudinal position as a previous position of one of the dynamic leading objects based on the acquired position data of the dynamic leading object. In response to determining that the current position of vehicle is at substantially the same longitudinal position as a previous position of the dynamic leading object, a lateral offset between the current position of the ego vehicle and the previous position of the dynamic leading object can be determined. The lateral offset can be used to identify a current travel lane of the ego vehicle, determine lane crossings, and/or determine travel lane probability distributions.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-14, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example an ego vehicle 100 is shown. As used herein, "vehicle" means any form of motorized transport. In one or more implementations, the ego vehicle 100 can be an automobile. While arrangements will be described herein with respect to automobiles, it will be understood that embodiments are not limited to automobiles. In some implementations, the ego vehicle 100 may be a watercraft, an aircraft or any other form of motorized transport. The ego vehicle 100 can have a front end 101 and a back end 102.

The ego vehicle 100 can have an associated longitudinal axis 103, which can be the central axis of the ego vehicle 100. The ego vehicle 100 can have an associated longitudinal direction 104. "Longitudinal direction" means any direction that is substantially parallel to and/or co-linear with the longitudinal axis 103. The ego vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. Such slight variations can apply as appropriate to other terms. The ego vehicle 100 can have an associated lateral direction 106. "Lateral direction" means any direction that is substantially parallel to and/or co-linear with the lateral axis 105.

The ego vehicle 100 can have an associated reference frame 107. "Reference frame" or "frame of reference" is a space defined by at least a two-dimensional coordinate axis. The reference frame 107 can include an x axis 108 and a y axis 109. The x axis 108 can correspond to the longitudinal direction 104 of the ego vehicle 100, and the y axis 109 can correspond to the lateral direction 106 of the ego vehicle 100. The origin O of the reference frame 107 can be any suitable point of the ego vehicle 100. For example, the origin O can correspond to a sensor location, a front end, a back end, a center point, a forward-most point, a rearward-most point, a front axle, a rear axle, a front bumper, a rear bumper, a midpoint, etc. of the ego vehicle 100 or the location of one or more sensors of the ego vehicle 100. The origin O can be established by a vehicle manufacturer or some other entity. It should be noted that, in one or more arrangements, the reference frame or frame of reference can be defined exclusively with respect to the ego vehicle 100 itself. In such case, the reference frame or the frame of reference is not defined based on the environment around the ego vehicle 100 nor based on a global coordinate system.

Figure 2:
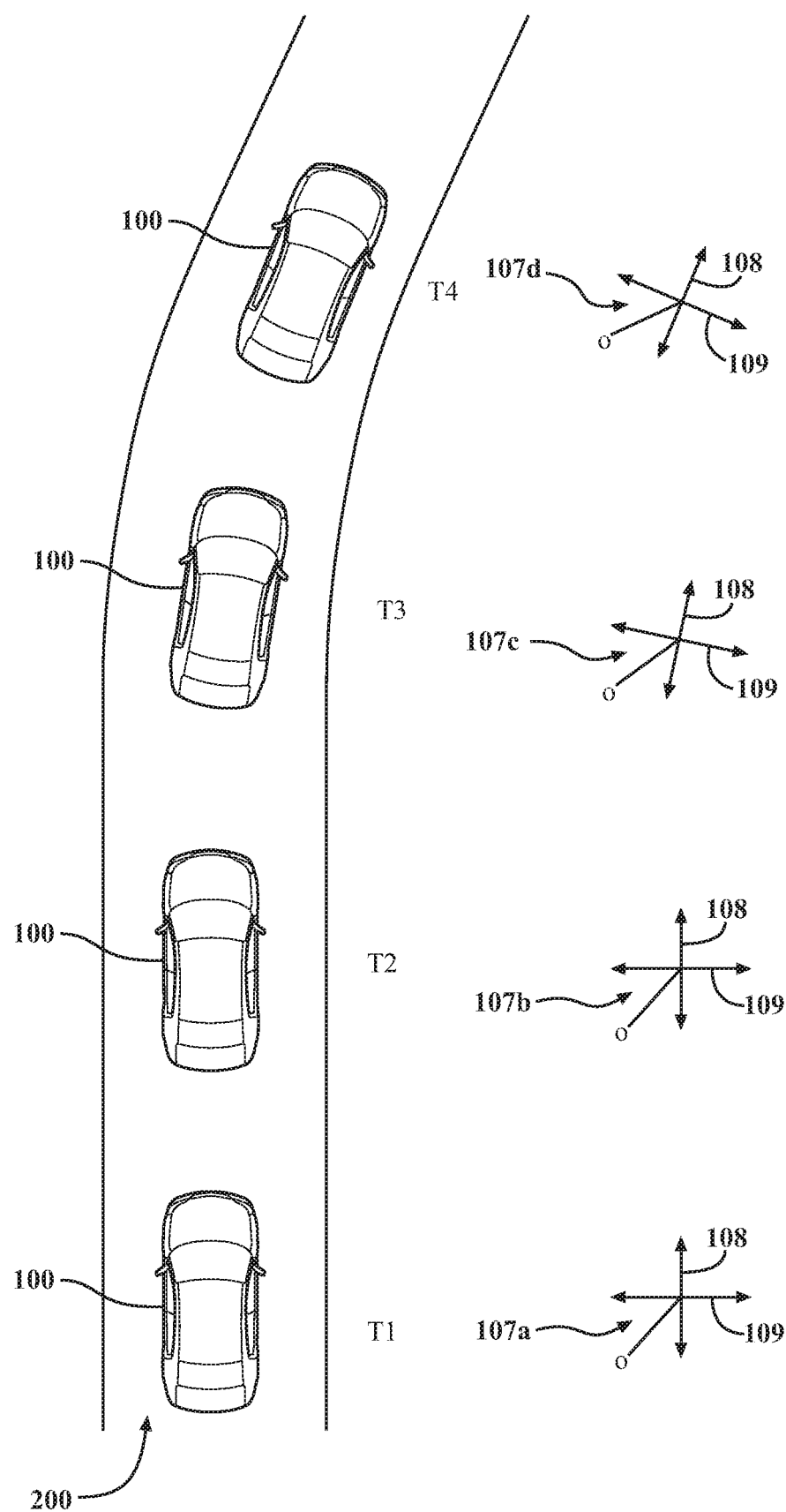
FIG. 2 shows an example of an ego vehicle traveling on a road over a period of time, showing changes in a reference frame of the ego vehicle.

The reference frame 107 can change over time based on changes in the orientation of the ego vehicle 100. FIG. 2 shows an example of the ego vehicle 100 traveling on a road 200. The ego vehicle 100 is shown at four different locations on the road 200 at different moments in time T1, T2, T3, T4. The reference frame of the ego vehicle 100 is shown at each of these different moments in time. At T1, reference frame 107*a* is an initial reference frame. At T2, the ego vehicle 100 has moved forward on the road 200; the orientation of the ego vehicle 100 has not changed. Thus, reference frame 107*b* is identical to reference frame 107*a*. At T3, the ego vehicle 100 has begun to turn as the road 200 begins to curve to the right. Thus, the reference frame 107*c* at time T3 has rotated clockwise corresponding to the change in orientation of the ego vehicle 100. At T4, the ego vehicle 100 continues to turn toward to the right with the curvature in the road. Accordingly, the reference frame 107*d* at time T4 has further rotation clockwise.

Returning to FIG. 1, the ego vehicle 100 can have a manual operational mode in which all of or a majority of the navigation and/or maneuvering of the ego vehicle 100 is performed by a human driver. In one or more arrangements, the ego vehicle 100 can be a conventional vehicle that is configured to operate in only a manual mode.

In one or more arrangements, the ego vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the ego vehicle 100 can be highly automated or completely automated.

The ego vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. Examples of a semi-autonomous operational mode is when an adaptive cruise control and/or lane keeping is activated.

The ego vehicle 100 can be configured to be switched between the various operational modes, including between any of the above-described operational modes. Such switching can be implemented in any suitable manner, now known or later developed. The switching can be performed automatically, selectively, or it can be done responsive to receiving a manual input or request.

The ego vehicle 100 can include various elements. Some of the possible elements of the ego vehicle 100 are shown in FIG. 1 and will now be described. It will be understood that it is not necessary for the ego vehicle 100 to have all of the elements shown in FIG. 1 or described herein. The ego vehicle 100 can have any combination of the various elements shown in FIG. 1. Further, the ego vehicle 100 can have additional elements to those shown in FIG. 1. In some arrangements, the ego vehicle 100 may not include one or more of the elements shown in FIG. 1. Further, while the various elements are shown as being located within the ego vehicle 100 in FIG. 1, it will be understood that one or more of these elements can be located external to the ego vehicle 100. Further, the elements shown may be physically separated by large distances.

The ego vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the ego vehicle 100. For instance, the processor(s) 110 can be an electronic control unit (ECU).

The ego vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact. In some instances, one or more data stores 115 can be located onboard the ego vehicle 100. In some instances, one or more data stores 115 can be located remote from the ego vehicle 100. For instance, one or more of the data stores 115 can be located on a remote server. The remote server can be communicatively linked to the ego vehicle 100 through one or more communication networks.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed. However, in some instances, the one or more data stores 115 may not have any map data. Further, it should be noted that arrangements described herein are configured to identify a current travel lane without the need for high quality and/or highly detailed maps or any maps. In some instances, the map data 116 can include the number of travel lanes for a particular road. In some instances, the map data 116 can also contain road topology information. The road topology information can describe how lanes are connected, the addition and/or deletion of lanes, and which side of the road such added or deleted lanes are located. In some instances, the map data 116 can include lane width data for a particular road.

The one or more data stores 115 can include surrounding vehicle data 117. The surrounding vehicle data 117 can include data relating to surrounding vehicle(s) as acquired by one or more sensors of the sensor system 120 over time. The surrounding vehicle data 117 can include data acquired by the sensor system 120 of the surrounding vehicle(s) that is reviewed, processed, analyzed, modified, and/or transformed. The surrounding vehicle data 117 can include the location/position of the surrounding vehicle(s). The surrounding vehicle data 117 can include longitudinal distance and/or lateral distance to the surrounding vehicle(s) in the original reference frame of the ego vehicle 100 (the reference frame of the ego vehicle 100 when the surrounding vehicle was initially detected). The position data of the surrounding vehicle(s) in the longitudinal and/or lateral direction can be referred to as "breadcrumbs." The surrounding vehicle data 117 can include temporal data when the surrounding vehicle data 117 was acquired.

The surrounding vehicle data 117 can include longitudinal distance and/or lateral distance to the surrounding vehicle(s) in the current reference frame of the ego vehicle 100 (the reference frame of the ego vehicle 100 when the surrounding vehicle was initially detected). The surrounding vehicle data 117 can include any identifiers assigned by a sensor to data that it acquires. The surrounding vehicle data 117 can include unique object identifiers assigned to acquired sensor data so that two surrounding objects should have the same unique ID. The surrounding vehicle data 117 can also include indications of the validity of a particular sensor reading. For instance, if an error is detected, then any data acquired by a sensor when such an error is detected can be flagged. As will be described herein, a lateral offset between the ego vehicle 100 and the surrounding vehicle(s) can be determined. This lateral offset can be tracked over time. The surrounding vehicle data 117 can include the lateral offset.

The data store(s) 115 can be communicatively linked to one or more elements of the ego vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the ego vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the ego vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the ego vehicle 100 (including any of the elements shown in FIG. 1). The sensor system 120 can acquire data of at least a portion of the external environment of the ego vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the ego vehicle 100 itself (e.g., position, orientation, speed, etc.). Alternatively or in addition, the sensor system 120 can include one or more environment sensors 123 configured to acquire, detect, determine, assess, monitor, measure, quantify and/or sense driving environment data. "Driving environment data" includes and data or information about the external environment in which a vehicle is located or one or more portions thereof. For example, the one or more environment sensors 123 can detect, determine, assess, monitor, measure, quantify and/or sense obstacles in at least a portion of the external environment of the ego vehicle 100 and/or information/data about such obstacles. Such obstacles may be stationary objects and/or dynamic objects. The one or more environment sensors 123 can detect, determine, assess, monitor, measure, quantify and/or sense other things in the external environment of the ego vehicle 100, such as, for example, lane markers, signs, traffic lights, traffic signs, lane lines, crosswalks, curbs proximate the ego vehicle 100, off-road objects, etc. In one or more arrangements, the one or more environment sensors 123 can include a global navigation satellite system (GNSS), a global positioning system (GPS), a navigation system (which can be the navigation system 147 described below), and/or other suitable sensors.

The sensor system 120 can include one or more sensors configured to detect, determine, assess, monitor, measure, quantify and/or sense position and orientation changes of the ego vehicle 100, such as, for example, based on inertial acceleration. In one or more arrangements, the sensor system 120 can include accelerometers, gyroscopes and/or other suitable sensors. The sensor system 120 can include sensors that can detect, determine, assess, monitor, measure, quantify, and/or sense one or more characteristics of the ego vehicle 100. In one or more arrangements, the sensor system 120 can include a speedometer (not shown). The speedometer can determine a current speed of the ego vehicle 100, or data acquired by the speedometer can be used to determine a current speed of the ego vehicle 100. In one or more arrangements, the ego vehicle 100 can have a yaw rate sensor 122.

The sensor system 120 can include one or more sensors configured to sense the external environment of the ego vehicle 100 or portions thereof. For instance, the sensor system 120 can be configured to acquire data of at least a portion of an external environment of the automated ego vehicle 100. The sensor system 120 can be configured to acquire data of at least a forward portion of an external environment of the automated ego vehicle 100. "Forward portion" means a portion of the external environment that is located in front of some point of reference of the vehicle in the travel direction of the vehicle. The point of reference can be any point of reference, including any of those described herein. Such environment sensors can be configured to detect, determine, assess, monitor, measure, quantify and/or sense objects in at least a portion of the external environment of the ego vehicle 100 and/or information/data about such objects. Various examples of such sensors will be described herein. However, it will be understood that the embodiments are not limited to the particular sensors described.

In one or more arrangements, the sensor system 120 can include one or more ranging sensors. "Ranging sensors" include sensors that can detect, determine, assess, monitor, measure, quantify and/or sense objects from a distance and do not require physical contact with the object. Various examples of ranging sensors will be described herein.

Various examples of sensors of the sensor system 120 will be described herein. The example sensors may be part of the one or more environment sensors 123 and/or the one or more vehicle sensors 121. However, it will be understood that the embodiments are not limited to the particular sensors described.

As an example, in one or more arrangements, the sensor system 120 can include one or more radar sensors 124, one or more lidar sensors 125, one or more sonar sensors 126, one or more cameras 127, and/or one or more ranging sensors 128. Such sensors can be used to detect, determine, assess, monitor, measure, quantify and/or sense, directly or indirectly, the presence of one or more obstacles in the external environment of the ego vehicle 100, the position or location of each detected obstacle relative to the ego vehicle 100, the distance between each detected obstacle and the ego vehicle 100 in one or more directions (e.g., in a longitudinal direction, a lateral direction and/or other direction(s)), the elevation of each detected obstacle, the speed of each detected obstacle and/or the movement of each detected obstacle.

The sensor system 120, the processor(s) 110, and/or one or more other elements of the ego vehicle 100 can be operable to control movements of one or more of the sensors of the sensor system 120. It should be noted that any of the sensors described herein can be provided in any suitable location with respect to the ego vehicle 100. For instance, one or more sensors can be located within the ego vehicle 100, one or more sensors can be located on the exterior of the ego vehicle 100 and/or one or more sensors can be located so as to be exposed to the exterior of the ego vehicle 100.

The ego vehicle 100 can include an input system 130. An "input system" includes any device, component, system, element or arrangement or groups thereof that enable information/data to be entered into a machine. The input system 130 can receive an input from a vehicle occupant (e.g., a driver or a passenger). Any suitable input system 130 can be used, including, for example, a keypad, display, touch screen, multi-touch screen, button, joystick, mouse, trackball, microphone and/or combinations thereof.

The ego vehicle 100 can include an output system 135. An "output system" includes any device, component, system, element or arrangement or groups thereof that enable information/data to be presented to a vehicle occupant (e.g., a person, a vehicle occupant, etc.). The output system 135 can present information/data to a vehicle occupant. The output system 135 can include a display. Alternatively, or in addition, the output system 135 may include an earphone and/or speaker. Some components of the ego vehicle 100 may serve as both a component of the input system 130 and a component of the output system 135.

The ego vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the ego vehicle 100 can include one or more object detection modules 137. The object detection module(s) 137 can be configured to detect objects in the driving environment of the ego vehicle 100, including dynamic leading objects. The detection of a dynamic leading object can be performed in any suitable manner. For instance, the detection can be performed using data acquired by one or more sensors of the sensor system 120. Any suitable object detection technique, now known or later developed, can be used.

If a dynamic leading object is detected, the object detection module(s) 137 and/or other module(s) can, in one or more arrangements, attempt to classify the type, nature, and/or identity of the detected dynamic leading object. For example, the object detection module(s) 137 can classify whether the detected dynamic leading object is, for example, a car, a truck, a motorcycle, a pedestrian, or an animal, just to name a few possibilities. However, it will be appreciated that, in some instances, the classification of the detected object may not be possible for one or more reasons. In some instances, the object detection module(s) 137 can be configured to filter or ignore dynamic leading objects that are not determined to be vehicles.

The object detection module(s) 137 can attempt to classify the dynamic leading object in any suitable manner. For instance, in one or more arrangements, the object detection module(s) 137 can include and/or have access to an object image database. The object image database can include one or more images of a plurality of different objects, including vehicles. The images may be of one or more portions of the exterior of at least a portion of a plurality of different objects. For instance, the images can be of at least a portion of an object. The object detection module(s) 137 can also include any suitable object recognition software. The object recognition software can analyze sensor data captured by the sensor system 120. The object recognition software can query the object image database for possible matches. For instance, images captured by the camera(s) 127 can be compared to images in the object image database for possible matches. Alternatively or in addition, measurements or other aspects of an image captured by the camera(s) 127 can be compared to measurements or other aspects of any images in the object image database. The object detection module(s) 137 can classify the detected object as a particular type of object if there is a match between the captured image and an image in the object database. "Match" or "matches" means that an image or other information collected by the sensor system and one or more of the images in the object image database are substantially identical. For instance, an image or other information collected by the sensor system and one or more of the images in the object image database can match within a predetermined probability (e.g., at least about 85%, at least about 90%, at least about 95% or greater) or confidence level.

It should be noted that the sensor system 120 can be configured to acquire velocity data of objects in the external environment of the ego vehicle 100. The velocity data can be relative velocity of an object with respect to the ego vehicle 100. For example, the RADAR sensor(s) 124 can acquire relative velocity data of objects in the external environment of the ego vehicle 100 over time. The relative velocity data can be used for various purposes. For example, the relative velocity data can be used to filter or ignore objects that have not moved over time from consideration when classifying objects, as described above.

In one or more arrangements, the ego vehicle 100 can include one or more object tracking module(s) 138. The object tracking module(s) 138 can be configured to follow, observe, watch, and/or track the movement of an object over a plurality of sensor observations. "Sensor observation" means a moment of time or a period of time in which one or more sensors of a sensor system are used to acquire sensor data of at least a portion of an external environment of a vehicle.

The ego vehicle 100 can include one or more lane cross preprocessor modules 140. The lane cross preprocessor module(s) 140 can be configured to compare the current location of the ego vehicle 100 to previous locations of leading vehicles on the same road. As will be described in greater detail below, the lane cross preprocessor module(s) 140 can be configured to determine a lateral offset between a current location of the ego vehicle 100 and previous locations of leading vehicles when it was at the same longitudinal position along the road. Such information can be used to determine which travel lane the ego vehicle 100 is located in without the use of a highly detailed map.

The lane cross preprocessor module(s) 140 can be configured to monitor the position and orientation of the ego vehicle 100 over time. The lane cross preprocessor module(s) 140 can perform such monitoring using inputs from the sensor system 120 (e.g., one or more vehicle sensors 121, the yaw rate sensor(s) 122, etc.). The lane cross preprocessor module(s) 140 can be configured to determine the current reference frame 107 of the ego vehicle 100 and/or monitor changes in the reference frame 107 over time. It should be noted that the ego vehicle 100 may not have any awareness of its own reference frame relative to the world frame or other absolute frame. The ego vehicle 100 may have a general awareness of its lateral position relative to lane markers and/or a general notion of position on a road, but the ego vehicle 100 does not know whether it is on a curve or not. According to arrangements described herein, by operating relative to the frame of reference of the ego vehicle 100, an accurate and/or highly detailed map is not needed.

The lane cross preprocessor module(s) 140 can monitor the path of detected leading objects (e.g., vehicles) over time. The lane cross preprocessor module(s) 140 can be configured to acquire position data of the leading object(s) or cause position data of the leading object(s) to be acquired.

At a minimum, the position data can include the longitudinal distance from the ego vehicle 100 to the leading object in the original reference frame 107 of the ego vehicle 100, and the position data can include the lateral distance from the ego vehicle 100 to the leading object in the original reference frame 107 of the ego vehicle 100. "Original reference frame" means the reference frame of the vehicle at the time when the leading object was first detected. The position data of the leading object can be acquired by one or more environment sensors 123 of the sensor system 120. For instance, the positon data of the leading object can be acquired by the radar sensor(s) 124, the lidar sensor(s) 125, the camera(s) 127, or a fusion of any combination of such sensors. The position data of the leading object can be considered to be "breadcrumbs" or traces left by the leading object. The position data of the leading object can be acquired.

The position data of the leading object can include additional information as well. For example, the position data can include the time at which the position data of the leading object was captured. The position data can include non-unique identifier(s) assigned to the position data by the sensor(s) that acquired the position data. The position data can include a unique object identifier assigned to the leading object by one or more of the modules described herein. The position data can include an indicator as to whether the leading object is moving. The position data can include the validity of the measurement.

The lane cross preprocessor module(s) 140 can add new position data to the history for each dynamic leading object being monitored (e.g., the surrounding vehicle data 117). The lane cross preprocessor module(s) 140 can filter position data that is invalid, incomplete, or otherwise unreliable.

The lane cross preprocessor module(s) 140 can be configured to compare the current position of the ego vehicle 100 to previous positions of leading vehicle(s) on the same road. The lane cross preprocessor module(s) 140 can be configured to determine whether the current position of the ego vehicle 100 is at substantially the same longitudinal position as the dynamic leading object at a prior time. The current location of the ego vehicle 100 can be determined using the navigation system 175. The position of the dynamic leading object at a prior time can be determined based on the acquired position data of the dynamic leading object.

The ego vehicle 100 can determine whether the current position of the ego vehicle 100 is at substantially the same longitudinal position as the dynamic leading object at a prior time in any suitable manner. For instance, in one or more arrangements, the lane cross preprocessor module(s) 140 can be configured to transform the acquired position data of the dynamic leading object based on the current position and/or reference frame of the ego vehicle 100. Such transforming of the position data can be performed continuously, periodically, or at any other suitable time. The position data can be transformed in any suitable manner. For instance, the transforming can include translating the acquired position data of the dynamic leading object based on the current location of the ego vehicle 100. "Translating" means that changes in the x-y position of the ego vehicle are subtracted from the previously acquired position data of the dynamic leading object. Further, the transforming can include rotating the acquired position data of the dynamic leading object into the current reference frame of the ego vehicle 100 based on changes in its yaw. "Rotating" means transforming the acquired position data of the dynamic leading object into a coordinate system defined by the current reference frame of the ego vehicle.

By transforming the acquired position data of the dynamic leading object, the lane cross preprocessor module(s) 140 can determine whether the current position of vehicle is at substantially the same longitudinal position as the dynamic leading object at a prior time. In such case, the previous position of the dynamic leading object should have a value of zero or near zero in the longitudinal direction within the current reference frame of the ego vehicle 100.

If it is determined that the current position of the ego vehicle 100 is at substantially the same longitudinal position as the dynamic leading object at a prior time, a lateral offset between the current position of the ego vehicle 100 and the previous position of the dynamic leading object can be determined. The lateral offset can be determined by subtracting the values of the lateral position of the ego vehicle 100 and the lateral position of the dynamic leading object based on the transformed position data. The lateral offset can include a magnitude of lateral offset and a direction of lateral offset. It will be appreciated that the lane cross preprocessor module(s) 140 can enable the ego vehicle 100 to determine an estimated lateral offset from dynamic leading objects (e.g., other vehicles) regardless of any curvature in the road, as the dynamic leading objects would have to have been in line with the current location of the ego vehicle 100 at some time.

In some instances, there may not be position data for a detected dynamic leading object at a current position of the ego vehicle 100. In such cases, the lane cross preprocessor module(s) 140 can be configured to determine location data for the dynamic leading object when it was located at or near the current position of the ego vehicle 100. Such a determination can be made in any suitable manner using acquired position data of the dynamic leading object when the dynamic leading object was located near the current position of the ego vehicle 100. In one or more arrangements, such a determination can be made by averaging the acquired position data of the dynamic leading object when the dynamic leading object was located near the current position of the ego vehicle 100, which can include acquired position data before and/or after the current position of the ego vehicle 100. In some instances, the average can be a weighted average. In such case, acquired position data that is located closer to the current position of the ego vehicle 100 can be weighted higher than acquired position data that is located farther from the current position of the ego vehicle 100.

One example of the operation of the lane cross preprocessor module(s) 140 will now be described. Referring to FIGS. 3A-3D, an example of a driving scenario over a series of time is shown. In this example, the ego vehicle 100 can be traveling on a road 300. The road 300 can include three travel lanes, including a first travel lane 310, a second travel lane 320, and a third travel lane 330. At each moment in time in this example, the ego vehicle 100 can be located in the second travel lane 320. In this example, the ego vehicle 100 does not have road curvature data for the road 300. A leading vehicle 340 can be traveling in the first travel lane 310 of the road 300. The leading vehicle 340 is located ahead of the ego vehicle 100 in the travel direction of the ego vehicle 100. The ego vehicle 100 can detect its current frame of reference, position, yaw rate, and/or other information about itself continuously, periodically, irregularly, or at any time over the course of this driving scenario.

Figure 3A:
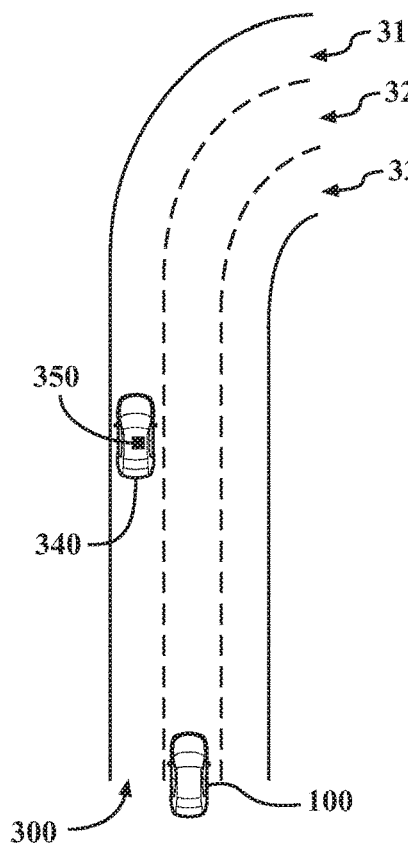
FIGS. 3A-3D show a driving scenario over a series of time in which an ego vehicle determines a lateral offset between its current position and a previous position of a dynamic leading object when the current position of the ego vehicle is at substantially the same longitudinal position as a previous position of the dynamic leading object.

FIG. 3A shows a moment in time in which the ego vehicle 100 initially detects the presence of the leading vehicle 340. The first sensor data 350 of the leading vehicle 340 can include position data of the leading vehicle 340. The position data can include the longitudinal distance from the ego vehicle 100 to the leading vehicle 340 in the original reference frame of the ego vehicle 100. The position data can include the lateral distance from the ego vehicle 100 to the leading vehicle 340 in the original reference frame of the ego vehicle 100. The position data can include temporal data, such as the time at which the position data of the leading vehicle 340 was captured. The position data can include non-unique identifier(s) assigned to the position data by the sensor(s) that acquired the position data. The position data can include a unique object identifier assigned to the leading vehicle 340 by one or more of the modules described herein. The position data can include an indicator as to whether the leading vehicle 340 is moving. The position data can include the validity of the measurement.

Figure 3B:
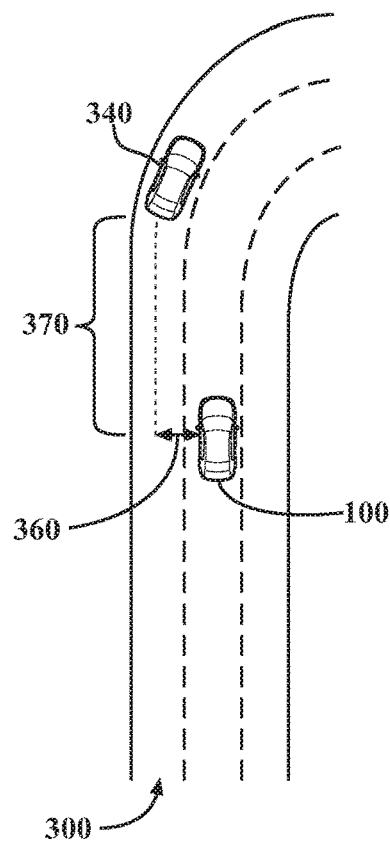

FIG. 3B shows a subsequent moment in time in which the ego vehicle 100 and the leading vehicle 340 have moved forward in the travel direction of the road 300. The ego vehicle 100 and the other vehicle remain in their respective lanes. The ego vehicle 100 can moved in a substantially linear manner. However, the orientation of the leading vehicle 340 has started to change as it has reached a curve in the road 300. While the leading vehicle 340 has moved forward, the ego vehicle 100 has acquired position data 370 of the leading ego vehicle 100 over time. At each time step, the position data of the leading vehicle 340 is transformed on the current position and/or the current reference frame of the ego vehicle 100. The transforming of the position data of the leading vehicle 340 can include translating the acquired position data of the leading vehicle 340 based on the current position of the ego vehicle 100. The transforming of the position data of the leading vehicle 340 can include transforming the acquired position data into the current reference frame of the ego vehicle 100. At FIG. 3B, the orientation of the ego vehicle 100 has not changed from the orientation in FIG. 3A. Thus, it may not be necessary to rotate the acquired position data into the current reference frame of the ego vehicle 100.

At the moment shown in FIG. 3B, the current position of the ego vehicle 100 is at substantially the same longitudinal position as a previous position of the leading vehicle 340 based on the acquired position data of the leading vehicle 340. In this particular example, the previous position of the leading vehicle 340 is the point at which the first sensor data 350 was acquired. Determining whether the current position of the ego vehicle 100 is at substantially the same longitudinal position as a previous position of the leading vehicle 340 is made within the current reference frame of the ego vehicle 100 by the lane cross preprocessor module(s) 140 and/or the processor(s) 110. In response to determining that the current position of the ego vehicle 100 is at substantially the same longitudinal position as a previous position of the leading vehicle 340, a lateral offset 360 between the current position of the ego vehicle 100 and the previous position of the leading vehicle 340 can be determined.

Figure 3C:
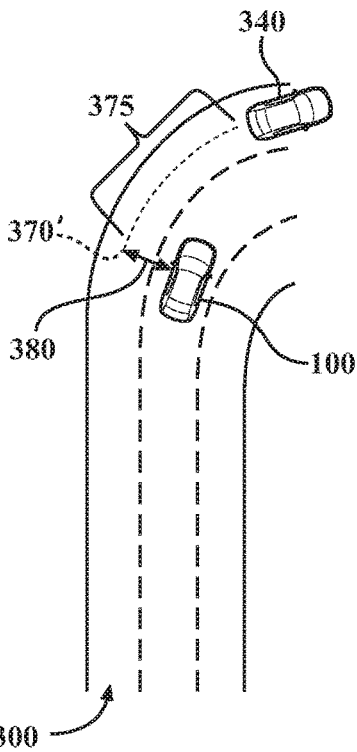

FIG. 3C shows a subsequent moment in time in which the ego vehicle 100 and the leading vehicle 340 have moved forward in the travel direction of the road 300. The ego vehicle 100 and the other vehicle remain in their respective lanes. The orientation of the ego vehicle 100 has now started to change as it has reached the curve in the road 300. The orientation of the leading vehicle 340 continues to change as it travels through the curve in the road 300. The ego vehicle 100 continues to acquire additional position data 375 of the leading ego vehicle 100 over time. At each time step, the acquired position data of the leading vehicle 340 is transformed on the current position and/or the current reference frame of the ego vehicle 100. At FIG. 3C, the orientation of the ego vehicle 100 has changed from the orientation in FIG. 3B. As a result, the frame of reference of the ego vehicle 100 has changed, and the acquired position data of the leading vehicle 340 can be transformed into the current reference frame of the ego vehicle 100.

At the moment shown in FIG. 3C, the current position of the ego vehicle 100 is at substantially the same longitudinal position as a previous position 370' of the leading vehicle 340 based on the acquired position data of the leading vehicle 340. The ego vehicle 100 can determine a lateral offset 380 between the current position of the ego vehicle 100 and the previous position of the leading vehicle 340.

Figure 3D:
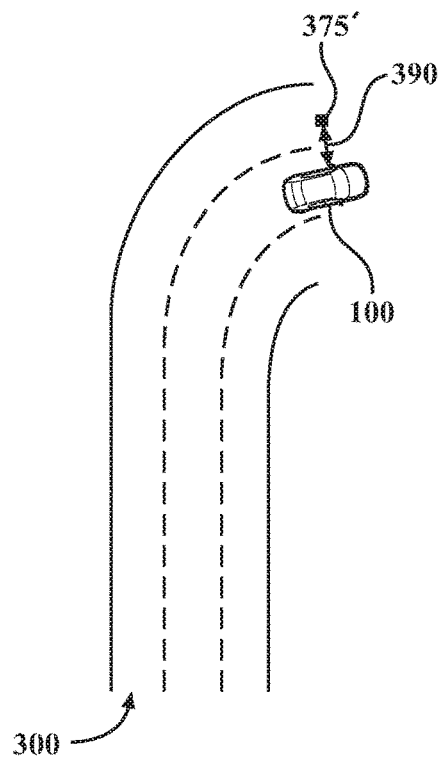

FIG. 3D shows a subsequent moment in time in which the ego vehicle 100 and the leading vehicle 340 have moved forward in the travel direction of the road 300. The leading vehicle 340 is no longer located within the portion of the road 300 shown in FIG. 3D. The ego vehicle 100 and the other vehicle remain in their respective lanes. The orientation of the ego vehicle 100 continues to change as it travels through the curve in the road 300. As a result, the frame of reference of the ego vehicle 100 has changed, and the acquired position data of the leading vehicle 340 can be transformed into the current reference frame of the ego vehicle 100. The ego vehicle 100 continues to acquire additional position data of the leading ego vehicle 100 over time. At the moment shown in FIG. 3D, the current position of the ego vehicle 100 is at substantially the same longitudinal position as a previous position 375' of the leading vehicle 340 based on the acquired position data of the leading vehicle 340. The ego vehicle 100 can determine a lateral offset 390 between the current position of the ego vehicle 100 and the previous position of the leading vehicle 340.

The determined lateral offsets can be output to one or more other components, systems, and/or modules of the ego vehicle 100 for further use, as will be described herein. While FIGS. 3A-3D show four discrete moments in time, it will be understood that there can be additional lateral offset determinations and other determinations and/or processes performed in the time between these different discrete moments.

The ego vehicle 100 can include one or more lane cross detection modules 145. The lane cross detection module(s) 145 can be configured to identify when the ego vehicle 100 crosses a travel lane and the direction of the lane crossing. As used herein, "travel lane" is a portion of a road that is designated for use by a single line of vehicles and/or a portion of a road that is being used by a single line of vehicles. "Lane crossing" means moving from one travel lane into another travel lane. The lane cross detection module(s) 145 can identify the occurrence of a lane crossing in any suitable manner. For instance, the lane cross detection module(s) 145 can identify the occurrence of a lane crossing with respect to surrounding vehicles and/or with respect to lane markers.

The lane cross detection module(s) 145 can identify the occurrence of a lane crossing with respect to surrounding vehicles by monitoring the relative motion of the ego vehicle 100 relative to surrounding vehicles. The identification of a lane crossing of the ego vehicle 100 in this manner can be made if there are two or more surrounding vehicles. The lane cross detection module(s) 145 can track over time the lateral offset between the ego vehicle 100 and the two or more surrounding vehicles, as determined by the lane cross pre-processor module(s) 140.

The lane cross detection module(s) 145 can receive the lateral offset between the ego vehicle 100 and the surrounding vehicles. The lateral offset history can be updated as the lateral offsets can be filtered according to one or more criteria to remove bad offsets. Any suitable criteria can be used. For example, a lateral offset can be filtered if the lateral offset would mean one of the vehicles in the determined offset is not located on the roadway. To this end, map data can be used. However, a highly detailed map with road curvature data or dense sampling is not needed to perform such filtering.

The lane cross detection module(s) 145 can analyze the lateral offset between the ego vehicle 100 and the surrounding vehicle(s) over time. Based on changes or non-changes in the lateral offset, a determination can be made as to whether a lane crossing has occurred. When the ego vehicle 100 offset changes by one lane, the ego vehicle 100 can determine that it changes lanes in the direction of the change in offset. Various examples of such a determination will be described below with reference to FIGS. 4-6.

Figure 4:
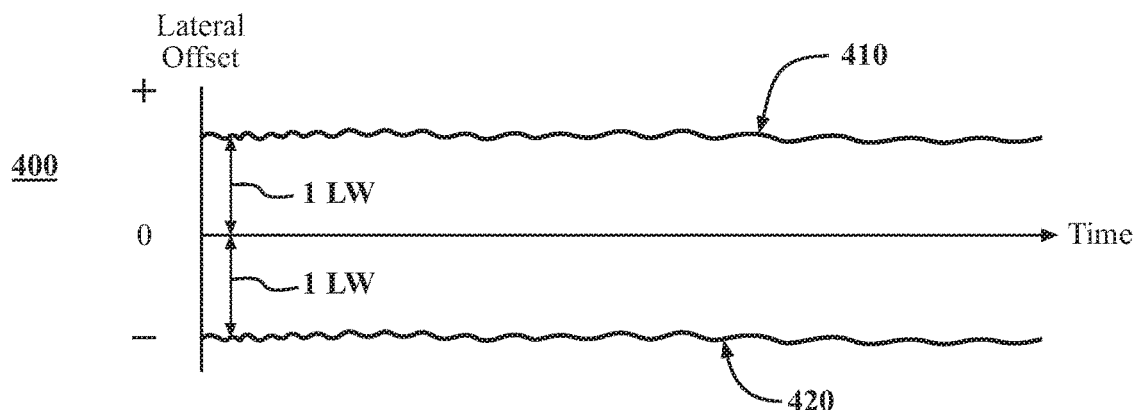
FIG. 4 is an example of lateral offset between current positions of the ego vehicle and previous positions of the dynamic leading object over time, showing an example in which no lane crossing has occurred.

FIG. 4 is a graph 400 of lateral offset 410 between the ego vehicle 100 and a first surrounding vehicle and the lateral offset 420 between the ego vehicle 100 and a second surrounding vehicle are over time. FIG. 4 shows an example in which, at time 0, the first surrounding vehicle was located to the right of the ego vehicle 100, and the second surrounding vehicle was located to the left of the ego vehicle 100. The spacing between the lateral offset 410 and the lateral offset 420 can be about one lane width. In the example shown in FIG. 4, the lateral offset 410 and the lateral offset 420 do not substantially change over time. In this example, the lane cross detection module(s) 145 would determine that no lane crossing has occurred.

Figure 5:
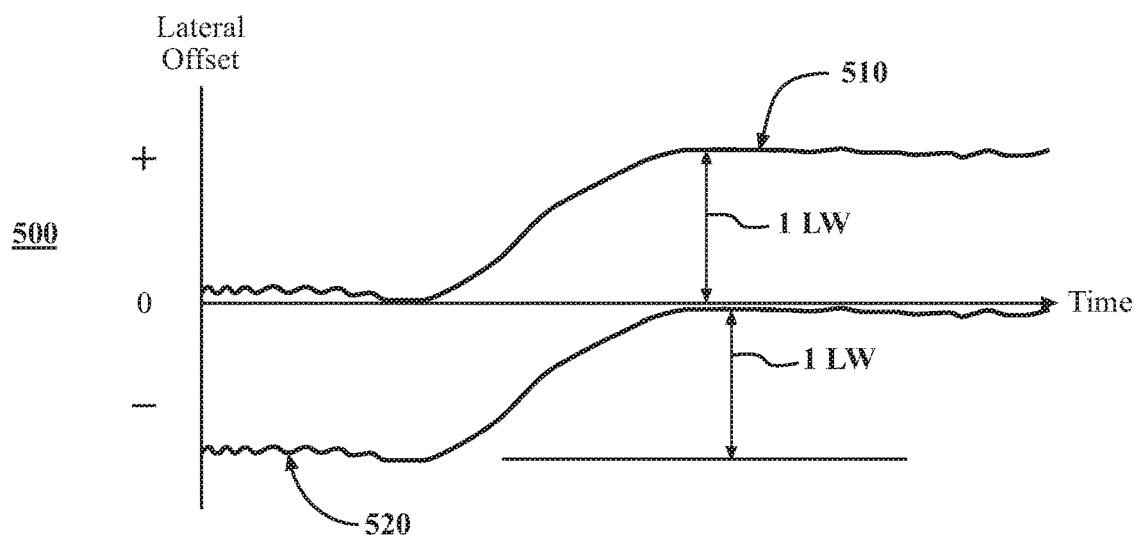
FIG. 5 is an example of lateral offset between current positions of the ego vehicle and previous positions of the dynamic leading object over time, showing an example in which a lane crossing has occurred.

A large change in lateral offset between the vehicle and the two or more surrounding vehicles can be an indicator of a lane crossing. The large change in lateral offset can be made with respect to any suitable threshold, such as at least about one lane width. Alternatively or in addition, if a majority or all of lateral offsets associated with surrounding vehicles move in the same direction relative to the ego vehicle 100, then it can be indicative of the ego vehicle 100 moving in the opposite direction. For example, if the lateral offsets of all of the surrounding vehicles move to the right of the ego vehicle 100, then it can be an indicator that the ego vehicle 100 has moved to the left while all of the surrounding vehicles have remained in the same lane. An example of such a scenario is shown in FIG. 5. FIG. 5 presents a graph 500 of lateral offset 510 between the ego vehicle 100 and a first surrounding vehicle and the lateral offset 520 between the ego vehicle 100 and a second surrounding vehicle over time. At time 0, the first surrounding vehicle was located to the right of the ego vehicle 100, and the second surrounding vehicle was located in the same travel lane in which the ego vehicle 100 is currently located. Over time, both lateral offsets 510, 520 shift in the same direction (to the right) by about one travel lane width. In such case, it can be determined that there was a lane crossing of the ego vehicle 100 to the left.

Figure 6:
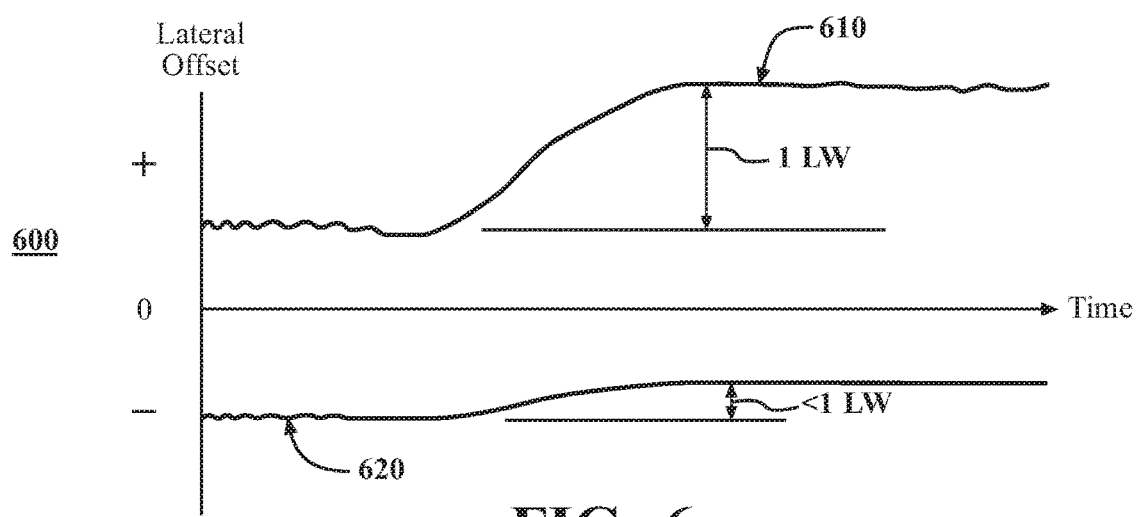
FIG. 6 is an example of lateral offset between current positions of the ego vehicle and previous positions of the dynamic leading object over time, showing an example in which it cannot be determined whether a lane crossing has occurred.

However, in some instances, it may not be possible to determine whether there was a lane crossing from lateral offset data alone. FIG. 6 shows an example of such a scenario. FIG. 6 presents a graph 600 of lateral offset 610 between the ego vehicle 100 and a first surrounding vehicle and the lateral offset 620 between the ego vehicle 100 and a second surrounding vehicle over time. At time 0, the first surrounding vehicle was located in the same travel lane in which the ego vehicle 100 is currently located, and the second surrounding vehicle was located one travel lane to the left of the current travel lane of the ego vehicle 100. Over time, the lateral offset 610 shifts by about one travel lane width to the right, but the lateral offset 620 shifts by less than one travel lane width to the right. In such case, the lane cross detection module(s) 145 cannot determine whether there has a lane crossing of the ego vehicle 100. In such instances, additional information can be used to determine whether a lane crossing has occurred. Non-limiting examples of other information include whether an activated turn signal of the ego vehicle 100 and/or the surrounding vehicle(s) is detected (e.g., by the turn signal detection module(s) 155), the yaw rate of the ego vehicle 100 and/or the surrounding vehicle(s) (e.g., by the yaw rate sensor(s) 122 and/or other sensor(s) of the sensor system 120), and/or GPS data of the ego vehicle 100 and/or the surrounding vehicles (e.g., by the navigation system 175 and/or other sensor(s) of the sensor system 120), or the motion relative to fixed roadway points such as street signs. By analyzing such additional information in combination with the lateral offset data, the lane cross detection module(s) 145 can determine whether there has been a lane crossing.

In some arrangements, in addition to using the lateral offset between the ego vehicle 100 and the surrounding vehicle(s), the lane cross detector module can monitor the motion of the ego vehicle 100 relative to lane markers on the current road. For instance, the ego vehicle 100 can use one or more sensors of the sensor system 120 (e.g., one or more cameras 127) to capture visual data of the external environment of the ego vehicle 100. Detection and analysis of the lane markers in visual data can be performed using any suitable technique, now known or later developed. For example, the use of lane markers to detect lane crossings is described in U.S. Pat. No. 9,460,624 which is incorporated herein by reference in its entirety. Using both the lateral offset of the ego vehicle 100 to the surrounding vehicle(s) and the lane markers can be advantageous when lane offset is unavailable or unreliable due to poor marker quality, non-existent lane markers, low sun angle, etc. In such cases, arrangements described herein can still be able to identify lane crossings.

The lane cross detection module(s) 145 can identify times during which a lane crossing may be missed. For instance, when the lane offset is unavailable and there are no surrounding vehicles. This information can be used when determining a lane identification confidence belief and/or when a lane identification decision must be reconfirmed.

In one or more arrangements, the lane cross detection module(s) 145 can be configured such that, if the lateral offset history indicates that all of the surrounding vehicles are moving in the same direction relative to the ego vehicle 100, then a larger degree in variation in the change in lateral offset between the ego vehicle 100 and each of the surrounding vehicles may be acceptable with respect to determining that there has been a lane crossing. Thus, the change in lateral offset of all of the surrounding vehicles may not move exactly one lane width. In one or more arrangements, the lane cross detection module(s) 145 can be configured such that, if the lateral offset history indicates that most but not all of the surrounding vehicles are moving in the same direction relative to the ego vehicle 100, then a smaller degree in variation in the change in lateral offset between the ego vehicle 100 and each of the surrounding vehicles may be acceptable with respect to determining that there has been a lane crossing. In such case, the change in lateral offset of the surrounding vehicle that have moved must be closer to one lane width.

The lane cross detection module(s) 145 can output any information that it determines to any component, system, and/or module of the ego vehicle 100 for any purpose. In one or more arrangements, the lane cross detection module(s) 145 can output information to a lane identification filter module 150.

The ego vehicle 100 can include one or more lane identification filter modules 150. The lane identification filter module(s) 150 can determine a probability distribution as to the current travel lane of the ego vehicle 100 across all travel lanes of a road on which the ego vehicle 100 is currently traveling. The lateral offset between the ego vehicle 100 and the surrounding vehicle(s) can allow exact lane level localization on a road, particularly on roads with a plurality of middle lanes where the lane marker are a dashed pattern.

To make sure a determination, the lane identification filter module(s) 150 can use one or more inputs. Such input(s) can include, for example, the lateral offsets between the ego vehicle 100 and the surrounding vehicles. Such information can be received from the lane cross preprocessor module(s) 140. Another example of such input(s) can include the number of travel lanes of the current road. Such information can be obtained from acquired sensor data and/or map data 116. Another example of such input(s) can include lane crossing information. The lane crossing information can be received from the lane cross detection module(s) 145. Another example of such input(s) can include surrounding lane marker patterns, as detected by one or more sensors of the sensor system 120. Another example of such input(s) can be the lateral distance to known fixed locations on the road such as street signs or barriers.

Figure 7:
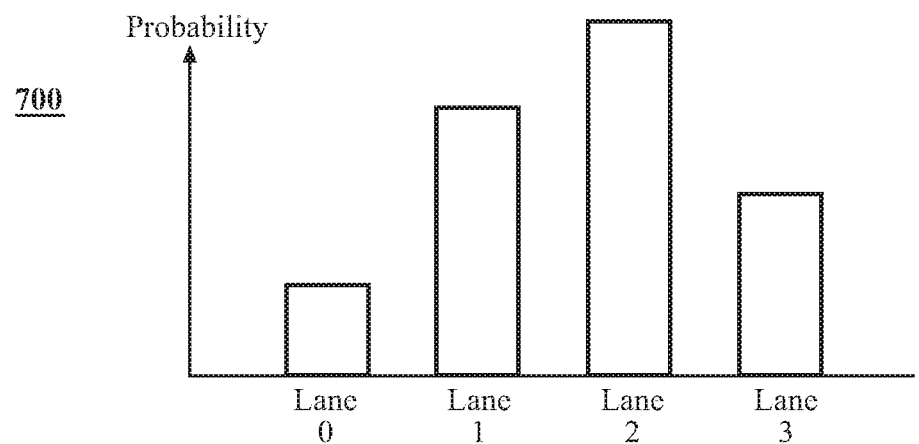
FIG. 7 is an example of a probability distribution that the ego vehicle is located in each travel lane of a current road.

The distribution of probability that the ego vehicle 100 is located in each travel lane of the current road can be initialized to a uniform distribution over number of lanes of the current road. This initial distribution can be subsequently updated over time based on one or more of the above inputs. FIG. 7 is an example of a graph 700 displaying a probability distribution for each travel lane of a current road the probability that the ego vehicle 100 is located in that lane. In this example, the road has four travel lanes—lane 0, 1, 2, and 3. At the moment shown in FIG. 7, the most probable travel lane in which the vehicle is located is lane 2 and the least probable travel lane in which the vehicle is located is lane 0.

Figure 8:
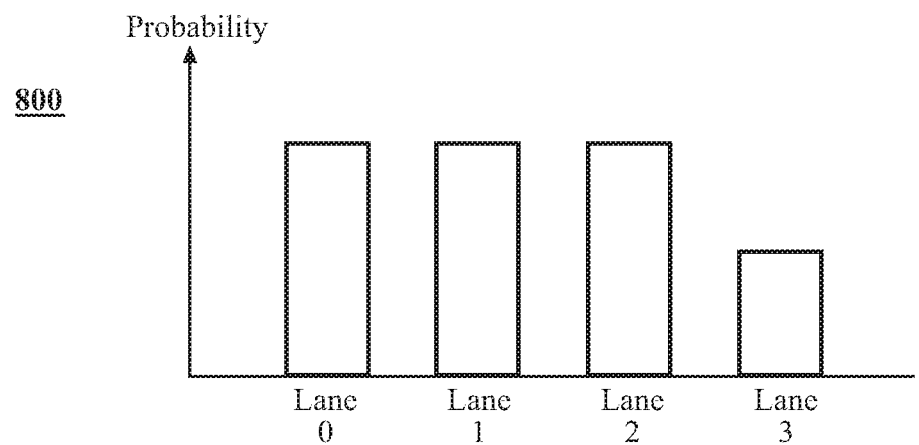
FIG. 8 is an example of a determined distribution of the likelihood that the ego vehicle is located in each travel lane of a current road based on lateral offset data between the ego vehicle and surrounding vehicles.

For each information input, the lane identification filter module(s) 150 can determine a likelihood that the vehicle is located in each travel lane of a current road. Such a determination can be made based on inputs of lateral offset data between the ego vehicle 100 and surrounding vehicles. FIG. 8 presents an example of a graph 800 of a likelihood that the ego vehicle 100 is located in each travel lane of a current road based on lateral offset data. In this particular example, the likelihood that the vehicle is located in lane 0, 1, and 2 is substantially equal based on the lateral offset data. However, the lateral offset data reveals a lower likelihood that the ego vehicle 100 is located in lane 3.

Figure 10:
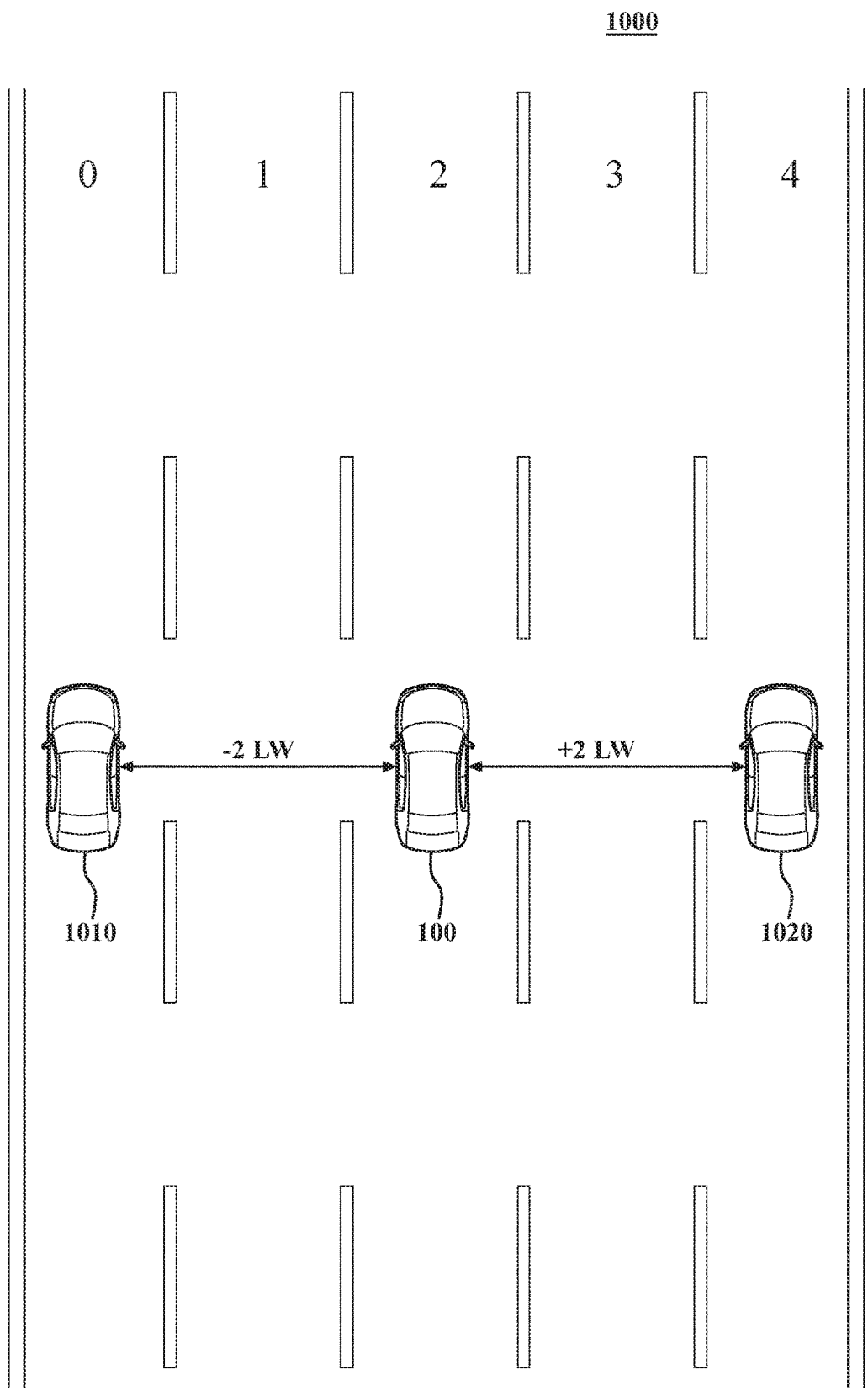
FIG. 10 is an example of a driving scenario in which lateral offset data between the ego vehicle and surrounding vehicles reveals the travel lane of the road in which the ego vehicle is currently located.
Figure 11:
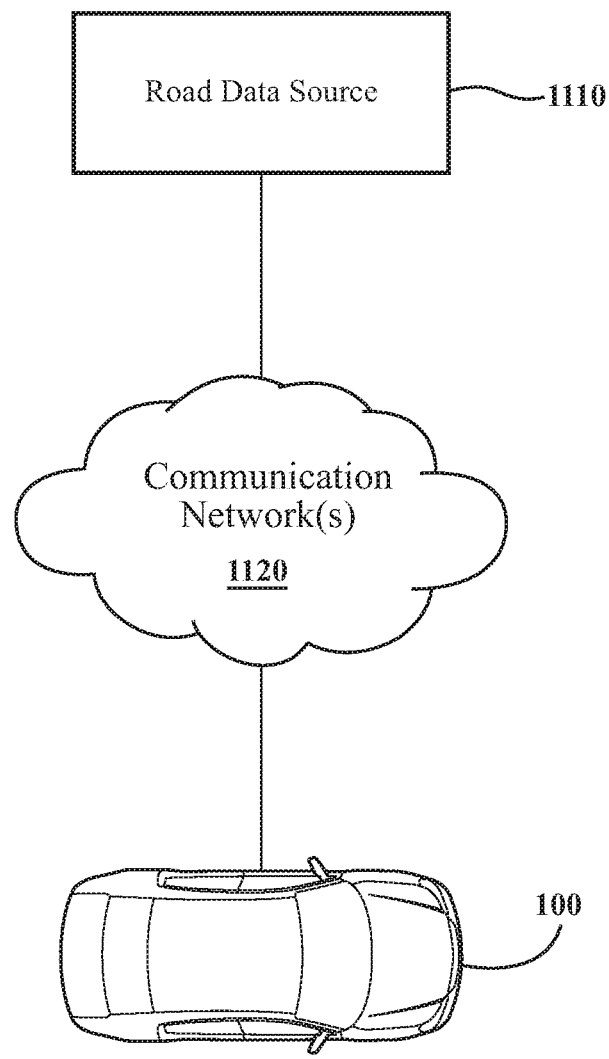
FIG. 11 is an example of an ego vehicle communicatively linked to a road data source.

In some instances, it may be possible to determine that it is highly unlikely that the ego vehicle 100 is located in a particular travel lane. In such cases, the likelihood that the ego vehicle 100 is located in that travel lane can be set to zero or a very low likelihood. One example of such a situation is shown in FIG. 10. FIG. 10 presents an example driving environment 1000 in which the ego vehicle 100 is being driven on a five lane road including lanes 0, 1, 2, 3, and 4. For clarity, the scenario in FIG. 10 does not correspond to the likelihood distribution presented in FIG. 8.

Reference number 1010 refers to a previous location of a first dynamic leading object, and reference number 1020 refers to a previous location of a second dynamic leading object. The lateral offset between the ego vehicle 100 and the first dynamic leading object 1010 can be approximately −2 lane widths. The lateral offset between the ego vehicle 100 and the second dynamic leading object 1020 can be approximately +2 lane widths. The ego vehicle 100 cannot be located in lanes 0, 1, 3, or 4 because it would result in the first dynamic leading object 1010 or the second dynamic leading object 1020 being off of the road. Thus, in a corresponding likelihood distribution, lane 2 will have a large likelihood and lanes 0, 1, 3, and 4 will have a very low likelihood. By updating the lane identification probability with this lane identification likelihood, the lane identification probability for the ego vehicle 100 will eventually converge to lane 2.

It will be appreciated that, according to arrangements described herein, the likelihood distribution can be determined even if the ego vehicle 100 detects only dashed lane markers on each side of the ego vehicle 100 or even when no lane markers are present or can be detected. Thus, a level of robustness can be added to lane identification to handle both poor lighting and poor road conditions. Again, these determinations can be made without explicit knowledge of road curvature.

In one or more arrangements, the lane identification filter module(s) 150 can adjust the likelihood that the vehicle is located in each travel lane using a distance factor. The distance factor can be based on the distance between the ego vehicle 100 and the surrounding vehicle at the time the surrounding vehicle was first detected or at the time when the position data that was used to determine the lateral offset was originally acquired. Generally, the smaller the distance between the ego vehicle 100 and the surrounding vehicle, the greater the effect that lateral offset will have on the likelihood that the ego vehicle 100 is located in a particular travel lane. The greater the distance between the ego vehicle 100 and the surrounding vehicle, the effect that the lateral offset will have on the likelihood that the ego vehicle 100 is located in a particular travel lane can be reduced.

In one or more arrangements, the distance between the ego vehicle 100 and the surround object can be compared to one or more thresholds. In one or more arrangements, the distance can be compared to a first threshold. The first threshold can be from about 80 meters to about 100 meters. Alternatively, the first threshold can be about 70 meters, about 75 meters, about 80 meters, about 85 meters, about 90 meters, about 95 meters, or about 100 meters, just to name a few possibilities. In one or more arrangements, if the distance is above the first threshold, then the effect of the lateral offset on the likelihood that the ego vehicle 100 is located in a particular travel lane can be reduced.

Alternatively or in addition, the distance between the ego vehicle 100 and the surrounding object can, in one or more arrangements, be compared to a second threshold. The second threshold can be from about 10 meters to about 30 meters. Alternatively, the first threshold can be about 5 meters, about 10 meters, about 15 meters, about 20 meters, about 25 meters, or about 30 meters, just to name a few possibilities. In one or more arrangements, if the distance is below the second threshold, then the effect of the lateral offset on the likelihood that the ego vehicle 100 is located in a particular travel lane can be increased.

In one or more arrangements, the distance can be compared to the first threshold and the second threshold. If the distance is above the first threshold, then the effect of the lateral offset on the likelihood that the ego vehicle 100 is located in a particular travel lane can be reduced. If the distance is below the second threshold, then the effect of the lateral offset on the likelihood that the ego vehicle 100 is located in a particular travel lane can be increased. If the distance is less than the first threshold but more than the second threshold, then there may be no change on the effect of the lateral offset on the likelihood that the ego vehicle 100 is located in a particular travel lane.

Figure 9:
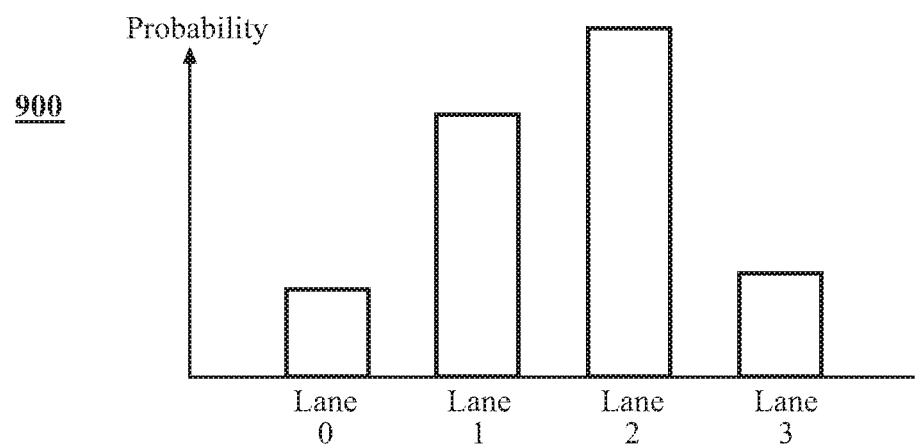
FIG. 9 is an example of an updated probability distribution that the ego vehicle is located in each travel lane of a current road, as adjusted based on the determined likelihood that the ego vehicle is located in each travel lane of a current road based on lateral offset data between the ego vehicle and surrounding vehicles.

FIG. 9 is an example of an updated distribution of the probability that the ego vehicle is located in each travel lane of a current road. FIG. 9 is a representation of the probability distribution of FIG. 7 adjusted by the likelihood distribution shown in FIG. 8. Such adjustment can be performed using any suitable statistical technique, now known or later developed. Notably, the probability that the ego vehicle 100 is located in lanes 0, 1, or 2 has increased while the probability that the ego vehicle 100 is located in lane 3 has decreased.

One example of updating the distribution of the probability will now be described in connection with FIGS. 7-9. For purposes of this example, the probability distribution in FIG. 7 can be 0.1, 0.3, 0.4, and 0.2 for lanes 0, 1, 2, and 3, respectively. Further, for purposes of this example, the likelihood distribution in FIG. 8 can be 1, 1, 1, and 0.6 for lanes 0, 1, 2, and 3, respectively. The updated probability can be determined in any suitable manner. In one or more arrangements, the updated probability can be determined according to the following formula: pp=(v*1)/sum(v*1), where pp is the updated probability, v is the current probability that the ego vehicle is located in lane n, 1 is the likelihood that the ego vehicle is located in lane n, and sum(v*1) is the summation of v*1 across all travel lanes of the road. Using the above values, the updated probability would be 0.109, 0.326, 0.435, and 0.130 for lanes 0, 1, 2, and 3, respectively. Thus, the updated probability that the ego vehicle 100 is located in lane 0, 1, or 2 has increased while the updated probability that the ego vehicle 100 is located in lane 3 has decreased.

Notably, for lanes which have the same likelihood, their relative relationship has not changed in the updated probability. In the example above, the relative relationship of the prior probability between lanes 0 and 1 is 1:3, and the relative relationship of the updated probability between lanes 0 and 1 is still 1:3 because the likelihood associated with each of these lanes was the same. However, if lanes have different likelihoods assigned to them, then their relative relationship will change in the update probability. In the example above, the relative relationship of the prior probability between lanes 2 and 3 is 2:1, and the relative relationship of the updated probability between lanes 2 and 3 is about 3.38:1 because the likelihood associated with each of these lanes was different.

The lane identification filter module(s) 150 can use lane crossings in the determination of a probability distribution. When the ego vehicle 100 (as detected by the lane cross detection module(s) 145) detects a lane crossing, the lane identification filter module(s) 150 can shift the probability to reflect the lane crossing. As an example, if the ego vehicle 100 changes from lane 1 to lane 2, the probability of those two lanes can be switched. Thus, the probability that was previously assigned to lane 1 can be re-assigned to lane 2, and the probability that was previously assigned to lane 2 can be re-assigned to lane 1. In this regard, the probability is not recalculated but is reassigned to different lanes as lane crossings are detected. In this way, computational time can be saved.

The ego vehicle 100 can include one or more turn signal detection modules 155. The turn signal detection module(s) 155 can analyze data from the sensor system 120. For example, the turn signal detection module(s) 155 can analyze visual data, acquired using one or more cameras 127 of the sensor system 120, to detect whether an object in the external environment of the ego vehicle 100 is signaling a left turn or a right turn. For instance, the acquired visual data can be analyzed, assessed, and/or processed by the turn signal detection module(s) 155 and/or the processor(s) 110 to detect whether a turn signal of another vehicle in the surrounding environment is activated. If it is detected that a turn signal is activated, then such information can be used to determine lane crossings and/or a current travel lane of the ego vehicle 100.

When a lane crossing is detected, a lane identification filter module can update the prior lane identification probability distribution by a function which shifts all or part of the probability in each lane by one lane in the direction of the lane change. For instance, when a left lane change is detected by the lane cross detection module(s) 145, a prior lane identification probability distribution of [0.1, 0.5, 0.4] could be updated by shifting 80% (or other percentage) of each lane's probability to the left, resulting in a new lane identification probability distribution of [0.4, 0.32, 0.08].

When the map data indicates that the numbering of the lanes has changed due to changes in the road topology such as lanes being added or deleted, the prior lane identification probability distribution can be updated by a function which shifts all or part of the probability in each lane by one lane in the direction of the lane change. For instance, when the map data 116 indicates a lane is added on the left, a prior lane identification probability distribution of [0.1, 0.5, 0.4] could be updated by shifting 80% (or other percentage) of each lane's probability to the right, resulting in a new lane identification probability distribution of [0.02, 0.18, 0.48, 0.32].

The ego vehicle 100 can include one or more autonomous driving modules 160. The autonomous driving module(s) 160 can receive data from the sensor system 120 and/or any other type of system capable of capturing information relating to the ego vehicle 100 and/or the external environment of the ego vehicle 100. In one or more arrangements, the autonomous driving module(s) 160 can use such data to generate one or more driving scene models. The autonomous driving module(s) 160 can determine position and velocity of the ego vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can receive, capture, and/or determine location information for obstacles within the external environment of the ego vehicle 100 for use by the processor(s) 110, and/or one or more of the modules described herein to estimate position and orientation of the ego vehicle 100, vehicle position in global coordinates based on signals from a plurality of satellites, or any other data and/or signals that could be used to determine the current state of the ego vehicle 100 or determine the position of the ego vehicle 100 in respect to its environment for use in either creating a map or determining the position of the ego vehicle 100 in respect to map data.

The autonomous driving module(s) 160 can determine travel path(s), current autonomous driving maneuvers for the ego vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the ego vehicle 100, changing travel lanes, merging into a travel lane, and/or reversing, just to name a few possibilities. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the ego vehicle 100 or one or more systems thereof (e.g., one or more of vehicle systems 170).

The ego vehicle 100 can include one or more alert modules 165. The alert module(s) 165 can cause an alert, message, warning, and/or notification to be presented within the ego vehicle 100. The alert module(s) 165 can cause any suitable type of alert, message, warning, and/or notification to be presented, including, for example, visual, audial, and/or haptic alert, just to name a few possibilities. The alert module(s) 180 can be operatively connected to one or more vehicle systems and/or components to cause the alert to be presented.

The ego vehicle 100 can include one or more vehicle systems 170. The one or more vehicle systems 170 can include a propulsion system, a braking system, a steering system, throttle system, a transmission system, a signaling system, and/or a navigation system 175. Each of these systems can include one or more mechanisms, devices, elements, components, systems, and/or combination thereof, now known or later developed. The above examples of the vehicle systems 170 are non-limiting. Indeed, it will be understood that the vehicle systems 170 can include more, fewer, or different vehicle systems. It should be appreciated that although particular vehicle systems are separately defined, each or any of the systems or portions thereof may be otherwise combined or segregated via hardware and/or software within the ego vehicle 100.

The navigation system 175 can include one or more mechanisms, devices, elements, components, systems, applications and/or combinations thereof, now known or later developed, configured to determine the geographic location of the ego vehicle 100 and/or to determine a travel route for the ego vehicle 100. The navigation system 175 can include one or more mapping applications to determine a travel route for the ego vehicle 100. The navigation system 175 can include a global positioning system, a local positioning system or a geolocation system.

The processor(s) 110 and/or one or more of the module(s) can be operatively connected to communicate with the various vehicle systems 170 and/or individual components thereof. For example, returning to FIG. 1, the processor(s) 110 and/or one or more of the module(s) can be in communication to send and/or receive information from the various vehicle systems 170 to analyze and/or control the movement, speed, maneuvering, heading, direction, location, position, etc. of the ego vehicle 100. The processor(s) 110 and/or one or more of the module(s) can be configured to control some or all of the vehicle systems 170 and, thus, may be partially or fully autonomous. For instance, when operating in an autonomous mode, the processor(s) 110 and/or the autonomous driving module(s) 160 can control the direction and/or speed of the ego vehicle 100. The processor(s) 110 and/or the autonomous driving module(s) 160 can cause the ego vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The ego vehicle 100 can include one or more actuators to modify, adjust and/or alter one or more of the vehicle systems 170 or components thereof to responsive to receiving signals or other inputs from the processor(s) 110 and/or one or more of the module(s). The one or more actuators can include motors, pneumatic actuators, hydraulic pistons, relays, solenoids, and/or piezoelectric actuators, just to name a few possibilities.

The ego vehicle 100 can be configured to obtain road information or data from any suitable source of such information or data. For instance, referring to FIG. 11, the ego vehicle 100 and/or one or more components of the ego vehicle 100 can be communicatively linked to one or more road data sources 1110 through one or more communication networks 1120.

The road data source 1110 can be any source of road-related information or data. The road data source 1110 can be, for example, a road and/or traffic server, a road and/or traffic condition database, a road and/or traffic news source, an online road and/or traffic database (e.g., a road and/or traffic-related website), a publication, a system or a source, as may be available from one or more public agencies (e.g., a national, state or local department of transportation), one or more public groups (e.g., a news reporting agencies) and/or one or more private groups. The ego vehicle 100 and/or one or more components of the ego vehicle 100 can be configured to determine or obtain road-related information or data in real-time.

Examples of road-related information or data that can be obtained by the ego vehicle 100 and/or one or more components of the ego vehicle 100 can include: traffic, closures, blockages, accidents, congestion, construction, current traffic speed, current travel lane information, posted speed limit, other traffic related events, road conditions, defects (e.g., potholes). The road-related information or data can apply to and/or can be associated with a road and/or one or more individual travel lanes of the road. In one or more arrangements, the ego vehicle 100 and/or one or more components of the ego vehicle 100 can obtain historical road-related information or data for a given location.

Now that the various potential systems, devices, elements and/or components of the ego vehicle 100 have been described, various methods will now be described. Various possible steps of such methods will now be described. The methods described may be applicable to the arrangements described above in relation to FIGS. 1-11, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 12:
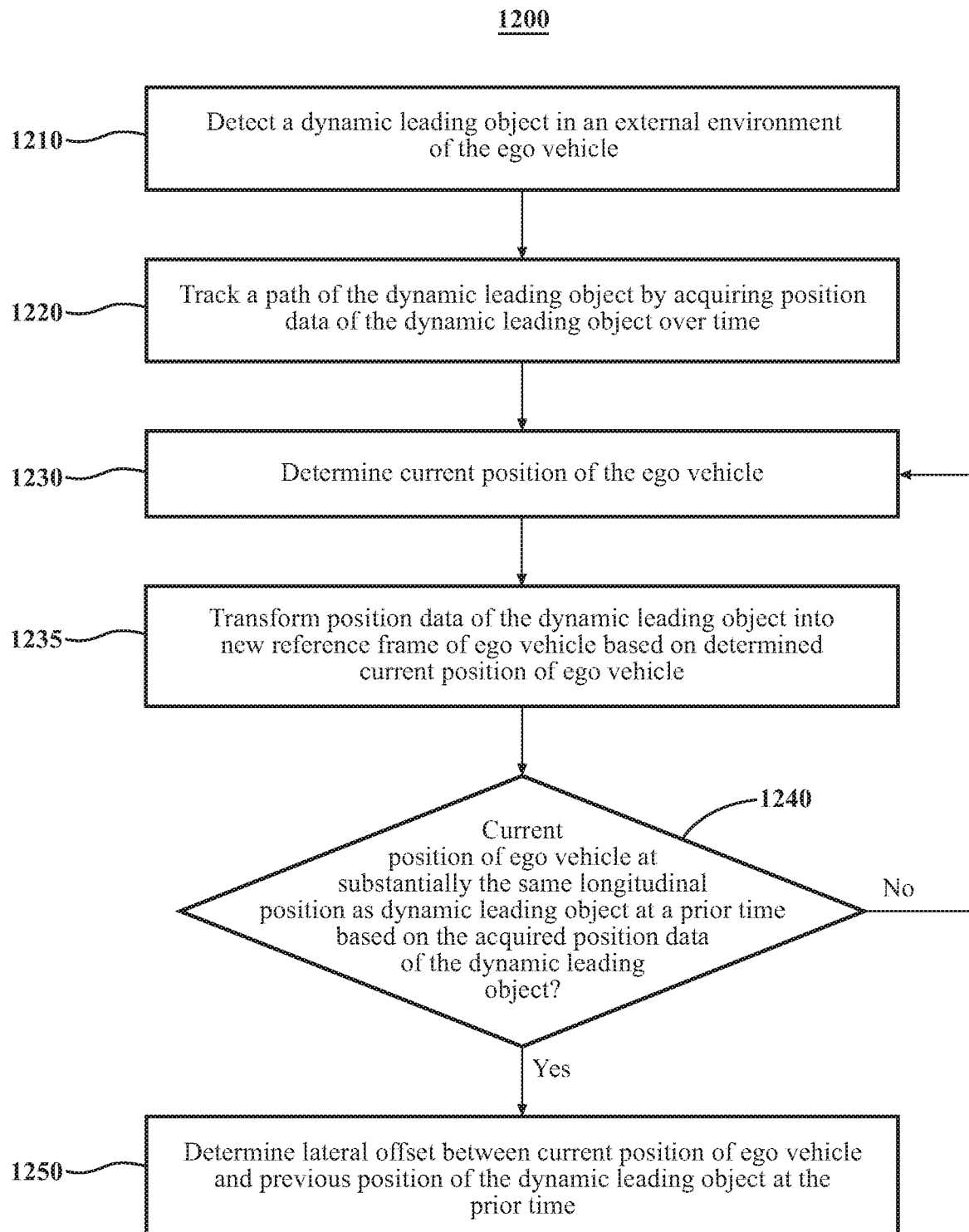
FIG. 12 is an example of a method of determining a lateral offset between a current position of an ego vehicle and a previous position of a dynamic leading object.

Referring now to FIG. 12, an example of a method 1200 of determining a lateral offset between a current position of an ego vehicle and a previous location of a dynamic leading object is shown. At block 1210, a dynamic leading object can be detected in an external environment of the vehicle. The detection can be performed by the object detection module(s) 137, the processor(s) 110, and/or the sensor system 120 using sensor data (e.g., lidar data, radar data, and/or camera data) of at least a portion of an external environment of the ego vehicle 100 acquired by one or more sensors of the sensor system 120. The detected dynamic leading object can be located forward of the ego vehicle 100 in the travel direction of the ego vehicle 100. If a dynamic leading object is not detected and/or if no objects are detected forward of the ego vehicle 100 in the travel direction of the ego vehicle 100, then the method 1200 can end, return to block 1210, or go to some other block. If a dynamic leading object is detected, the method 1200 can continue to block 1220.

At block 1220, a path of the dynamic leading object can be tracked over time. For instance, position data of the dynamic leading object can be acquired over time. The position data can include x-y coordinate data of the dynamic leading object in the vehicle's current reference frame. The position data can include the longitudinal distance and lateral distance to the vehicle in the original reference frame, temporal data (e.g., time at which the location data was acquired), longitudinal distance and lateral distance to the vehicle in the current vehicle reference frame, any identifiers assigned by the sensor that acquired the location data, any unique identifiers assigned by the present system to captured data, movement status (e.g., currently moving or was in the past moving), and whether the measurement is valid or invalid (e.g., due to sensor failure, tracking failure, or the object being outside of a predetermined range). The position data of the dynamic leading object can be acquired by one or more sensors of the sensor system. For instance, the position data of the dynamic leading object can be acquired by one or more radar sensors, one or more lidar sensors, and/or one or more cameras. The position data of the dynamic leading object can be acquired periodically, irregularly, or even randomly. The method 1200 can continue to block 1230.

At block 1230, a current position of the ego vehicle 100 can be determined. The determination can be made in the previous reference frame of the ego vehicle 100. Such a determination can be made in any suitable manner, such as by one or more sensors of the sensor system 120 and/or the navigation system 175. The orientation of the ego vehicle 100 can also be determined, such as by one or more sensors of the sensor system 120 (e.g., the yaw rate sensor 122). The determination of the current positon of the ego vehicle 100 can be determined continuously, periodically, irregularly, or even randomly. The method 1200 can continue to block 1235.

At block 1235, the new position of the ego vehicle 100 can be used to transform the position data of the dynamic leading object into the new reference frame of the ego vehicle 100. The method 1200 can continue to decision block 1240.

At decision block 1240, by reviewing the longitudinal distance to the transformed position data of the dynamic leading object, it can be determined whether the current position of the ego vehicle 100 is at substantially the same longitudinal position as the dynamic leading object at a prior time based on the acquired position data of the dynamic leading object. To make the comparison, the previously acquired position data of the dynamic leading object can be transformed to the current reference frame of the ego vehicle 100, as described above. The determining can be performed continuously, periodically, irregularly, and/or randomly. The determining can be performed by the lane cross preprocessor module(s) 140 and/or the processor(s) 110.

If the current position of the ego vehicle 100 is not at substantially the same longitudinal position as the dynamic leading object at a prior time based on the acquired position data of the dynamic leading object, the method 1200 can end, or the method 1200 can return to block 1230 or some other block. However, if the current position of the ego vehicle 100 is at substantially the same longitudinal position as the dynamic leading object at a prior time based on the acquired position data of the dynamic leading object, the method 1200 can continue to block 1250. At 1250, a lateral offset between the current position of the ego vehicle 100 and the prior position of the dynamic leading object can be determined. Such a determination can be made by the lane cross preprocessor module(s) 140 and/or the processor(s) 110. The determined lateral offset can be used by the ego vehicle 100 for various purposes as described herein.

The method 1200 can end. Alternatively, the method 1200 can return to block 1210 or some other block.

Figure 13:
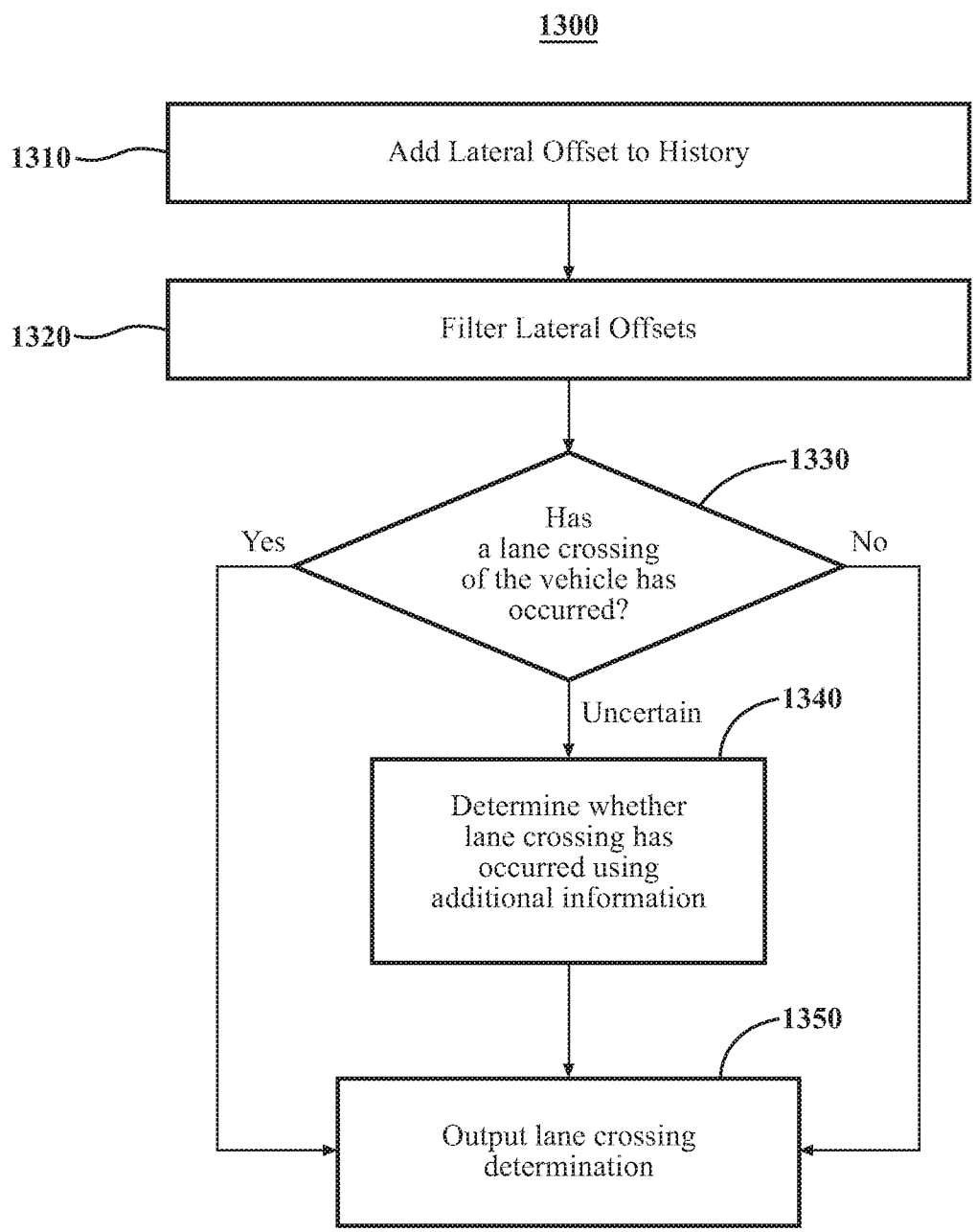
FIG. 13 is an example of a method of detecting a lane crossing using at least in part a lateral offset between a current position of an ego vehicle and a previous position of a dynamic leading object.

Referring now to FIG. 13, an example of a method 1300 of detecting a lane crossing using at least in part a lateral offset between a current position of a vehicle and a previous location of a dynamic leading object is shown. At block 1310, a determined lateral offset, as determined by the lane cross preprocessor module(s) 140, can be added to a lateral offset history (e.g., lateral offset data 118). The lateral offset history can be updated as each lateral offset is determined. The method 1300 can continue to block 1320.

At block 1320, the lateral offset history can be filtered to remove "bad lateral offsets," if any. A "bad lateral offset" can be any lateral offset that does not meet a predefined criteria (e.g., an object does not fall within any travel lanes of the road based on the size of the lateral offset) and/or is otherwise indicated as being a bad lateral offset (e.g., sensor fault is detected, target is outside of acceptable range of sensor, etc.). The determined lateral offsets can be filtered before or after they are added to the lateral offset history. The filtering of the lateral offsets can be performed by the lane cross detection module(s) 145 and/or the processor(s) 110. The method 1300 can continue to decision block 1330.

At decision block 1330, it can be determined whether a lane crossing has occurred. The determination can be made based on the filtered lateral offsets between the ego vehicle 100 and two or more surrounding vehicles over time. Any suitable analysis of the filtered lateral offsets can be performed to determine whether a lane crossing has occurred. Various examples of which are described above. The determination can be performed by the lane cross detection module(s) 145 and/or the processor(s) 110.

If it is determined that a lane crossing has occurred, the method 1300 can continue to block 1350. The determination of a lane crossing, which can also include a determined direction of lane crossing, can be output to one or more other components, systems, or modules of the ego vehicle 100. As an example, the determined lane crossing can be output to the lane identification filter module(s) 150.

If it is determined that a lane crossing has not occurred, then the method 1300 can continue to block 1350. In such case, the determination that a lane crossing has not occurred can be output to one or more other components, systems, or modules of the ego vehicle 100. As an example, the determination of no lane crossing can be output to the lane identification filter module(s) 150.

If a determination cannot be made as to whether a lane crossing has occurred, the method 1300 can continue to block 1340. At block 1340, additional information can be used to determine whether a lane crossing has occurred. The additional information can come from any suitable source. As an example, the additional information can include information as to whether the ego vehicle 100 and/or any of the surrounding vehicles in the lateral offset had an activated turn signal. Such information can be obtained from the turn signal detection module(s) 155 or other source (e.g., the sensor system 120). Alternatively or in addition, the additional information can include GPS data or other position data regarding the ego vehicle 100 and/or the surrounding vehicles. Such information can be obtained from the navigation system 175 or other source. Alternatively or in addition to any of the above examples, the additional information can include yaw rate information about the ego vehicle 100. Such information can be obtained from the sensor system 12. It will be understood that the above examples are non-limiting. Indeed, the additional information can include additional or different information than the information described above and can include any combination of additional information. Based on the additional information, the lane cross detection module(s) 145 and/or the processor(s) 110 can determine whether a lane cross has occurred. The method 1300 can continue to block 1350 as described above.

The method 1300 can end. Alternatively, the method 1300 can return to block 1310 or some other block.

Figure 14:
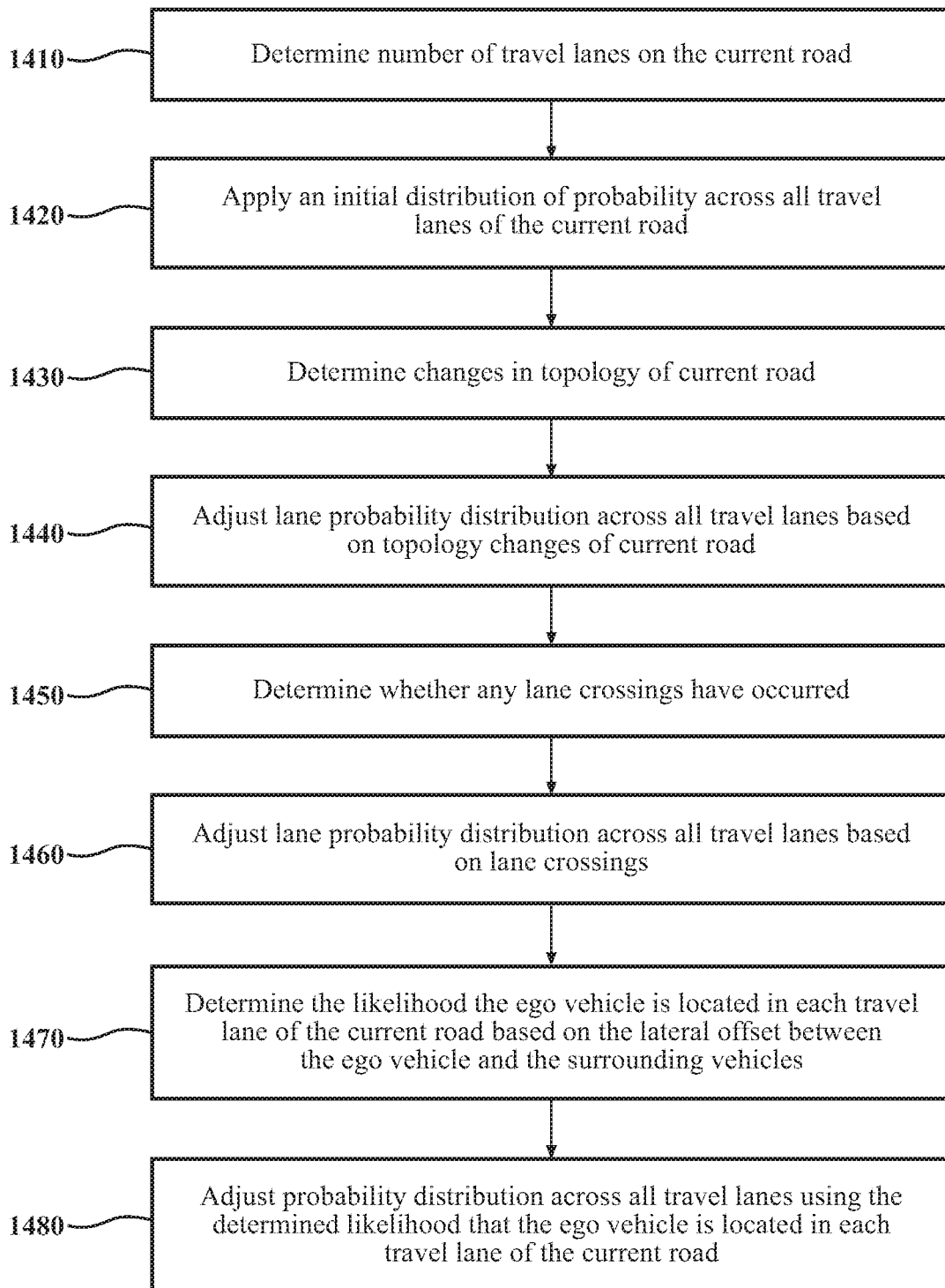
FIG. 14 is an example of a method of determining a lane probability distribution for an ego vehicle.

Referring now to FIG. 14, an example of a method 1400 of determining a lane probability distribution is shown. At block 1410, the number of travel lanes of a current road of the ego vehicle 100 can be determined. Such a determination can be made by the lane identification filter module(s) 150 and/or the processor(s) 110 using map data 116. It should be noted that such information can be obtained from map data 116 that is not highly detailed (e.g., that does not include road curvature/geometry information). The method 1400 can continue to block 1420.

At block 1420, an initial probability distribution that the ego vehicle 100 is located in a particular travel lane can be applied across all travel lanes. In one or more arrangements, the initial probability distribution can be equally divided among the number of travel lanes. Thus, in a four lane road for example, the initial probability distribution that the ego vehicle 100 is located in each travel lane would be 25%. The application of the initial probability distribution can be performed by the lane identification filter module(s) 150 and/or the processor(s). The method 1400 can continue to block 1430.

At block 1430, any changes in the topology of the road can be determined. Such a determination can be made by using, for example, map data 116. Such a determination can be made continuously, periodically, irregularly, or even randomly. The determination can be performed by the lane identification filter module(s) 150 and/or the processor(s). The method 1400 can continue to block 1440.

At block 1440, the lane probability distribution can be adjusted based on road topology changes. Such adjusting can be performed by the lane identification filter module(s) 150, other module(s), and/or the processor(s) 110. As an example, if a travel lane is added or deleted to the left of the current travel lane of the ego vehicle 100, the lane probability distribution is shifted because the underlying lane numbering will change because of the lane addition, as the lanes are numbered from left to right. However, if a travel lane is added or deleted to the right of the current travel lane of the ego vehicle 100, the lane probability distribution does not have to be shifted because the lane numbering does not change. The method 1400 can continue to block 1450.

At block 1450, any lane crossings of the ego vehicle 100 can be determined. Such a determination can be made in any suitable manner, now known or later developed. Such a determination can be made continuously, periodically, irregularly, or even randomly. The determination can be performed by the lane cross detection module(s) 145 and/or the processor(s) 110. The method 1400 can continue to block 1460.

At block 1460, the lane probability distribution can be adjusted based on any determined lane crossings. Such adjusting can be performed by the lane identification filter module(s) 150 and/or the processor(s) 110. The method 1400 can continue to block 1470.

At block 1470, the likelihood that the ego vehicle 100 is located in each travel lane of the current road can be determined. Such a determination can be made using information relating to the surrounding vehicles. More particularly, such a determination can be based on the lateral offset between the ego vehicle 100 and the surrounding vehicle(s). The determination can be performed by the lane identification filter module(s) 150 and/or the processor(s). The method 1400 can continue to block 1480.

At block 1480, the distribution of the probability that the ego vehicle 100 is located in a particular travel lane of the current road can be adjusted based on the determined likelihood that the ego vehicle 100 is located in each travel lane. The adjusting can be performed by the lane identification filter module(s) 150 and/or the processor(s).

The method 1400 can end. Alternatively, the method 1400 can return to block 1410 or some other block. While the ego vehicle 100 remains on the current road, the method 1400 can return to block 1430.

The lateral offset, lane crossing, and/or travel lane probability distribution can be used in various ways. For example, such information can be used to support the automation of a vehicle and/or to provide information to a vehicle driver. As an example, if the ego vehicle 100 wants to pass another vehicle located in front of it, the ego vehicle 100 must know that there is an available travel lane in which it can pass the other vehicle. Arrangements described herein can help the ego vehicle 100 identify the presence of such a lane. Further, information determined in accordance with arrangements described herein can be used in connection with the navigation of the ego vehicle 100. For instance, the current travel route of the ego vehicle 100 may include the ego vehicle 100 exiting the current road at an exit some distance ahead. By knowing what future actions will be required of the vehicle, the ego vehicle 100 can take into account the current travel lane of the ego vehicle 100 when planning for the exit.

In some instances, the ego vehicle 100 may provide an alert, such as by using the alert module(s) 165, to alert a driver of an upcoming action. The alert can be modified or adjusted based on the information determined herein. For instance, under a current travel plan of the vehicle, the driver must exit a highway seven miles ahead of its current position. Normally, the ego vehicle 100 may have a standard distance or time in which an alert of the exit is provided (e.g., when the ego vehicle 100 is located about 2 miles away from the exit). However, if the arrangements described herein determine that the ego vehicle 100 is located in the far left lane of the highway, then the alert module(s) 165 may take such information into account and cause an alert to presented to the driver sooner (e.g., at 3, 4, or 5 miles). In this way, the driver can take appropriate actions to begin moving toward the right to prepare for the upcoming exit.

In some arrangements, the ego vehicle 100 can use information determined herein (e.g., lateral offset, lane crossing, and/or travel lane probability distribution) along with road data (e.g., obtained from the road data source 1110), to alert or not alert a driver of an upcoming issue. For instance, the ego vehicle 100 can be traveling on a road with four travel lanes (lanes 0, 1, 2, 3). Using information from the road data source 1110, the ego vehicle 100 can determine that there is a large pot hole in lane 2. However, based on arrangements described herein, the ego vehicle 100 can determine that it is located in lane 0. In such case, the ego vehicle 100 can refrain from presenting an alert to the driver because, based on current conditions, the ego vehicle 100 will not encounter the pot hole. Therefore, the ego vehicle 100 will not provide an alert of the pot hole because such information is unnecessary. However, if the vehicle is determined to have changed travel lanes and becomes located in lane 2, then the ego vehicle 100 can provide an alert as to the presence of the pot hole.

The information can even be used when the ego vehicle 100 is highly automated. Though in such case the ego vehicle 100 may use highly detailed maps, there may be certain instances in which the information determined herein can be beneficial, such as during initialization and outages. As an example, in some instances, the sensor system 120 of the ego vehicle 100 may become blind (e.g., sunblind or poor road conditions) relative to lane markers or other reference points, causing the vehicle to lose the ability to localize itself. Thus, there can be a temporary outage in the autonomous operation of the ego vehicle 100. A human occupant of the ego vehicle 100 can take control over the operation of the ego vehicle 100. During this time, arrangements described herein can keep track of which travel lane the vehicle is located in. When the human occupant turns control back over to the ego vehicle 100, such information can minimizing the time for the ego vehicle 100 to ramp up to full automation. Arrangements described herein can also be beneficial when the highly automated vehicle enters a new driving environment, such as entering a highway. The information determined according to arrangements described herein can minimize the time it takes for the vehicle to initialize itself in the new driving environment.

It will be appreciated that arrangements described herein can provide numerous benefits, including one or more of the benefits mentioned herein. For example, arrangements described herein can determine a current travel lane of a vehicle without having or using road curvature data. Arrangements described herein can determine a current travel lane of a vehicle without a high precision and/or high detail map of the environment. Arrangements described herein can determine a current travel lane of a vehicle even when lane markers are not visible or do not exist. Arrangements described herein can reduce computational time and cost. Arrangements described herein can provide a more robust way of identifying a current travel lane of a vehicle. Arrangements described herein can detect lane crossings that occur in a curved portion of a road. Arrangements described herein can identify a current travel lane of a vehicle in scenarios in which there are more than three lanes on a road. Arrangements described herein can be achieved without direct communication with other vehicles.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of identifying a current travel lane for an ego vehicle traveling on a road, the method comprising:
    detecting a dynamic leading object in an external environment of the ego vehicle;
    acquiring position data of the dynamic leading object over time;
    determining a current position of the ego vehicle;
    determining a current reference frame of the ego vehicle;
    transforming the acquired position data of the dynamic leading object based on the current position and the current reference frame of the ego vehicle;
    determining whether the current position of the ego vehicle is at substantially the same longitudinal position as a previous position of the dynamic leading object based on the acquired position data of the dynamic leading object; and
    responsive to determining that the current position of the ego vehicle is at substantially the same longitudinal position as a previous position of the dynamic leading object, determining a lateral offset between the current position of the ego vehicle and the previous position of the dynamic leading object using the transformed acquired position data.

2. The method of claim 1, further including:
    determining a current travel lane of the ego vehicle based at least partially on the determined lateral offset, whereby lane identification is performed without road curvature data.

3. The method of claim 1, wherein transforming the acquired position data of the dynamic leading object based on the current position and the current reference frame of the ego vehicle includes:
    translating the acquired position data of the dynamic leading object based on the current position of the ego vehicle; and
    rotating the acquired position data into the current reference frame of the ego vehicle.

4. The method of claim 1, further including:
if there is no position data for the dynamic leading object at a current position of the ego vehicle, determining position data for the dynamic leading object at the current position of the ego vehicle using acquired position data of the dynamic leading object when the dynamic leading object was located near the current position of the ego vehicle.

5. The method of claim 4, wherein determining position data for the dynamic leading object at the current position of the ego vehicle using acquired position data of the dynamic leading object when the dynamic leading object was located near the current position of the ego vehicle includes:
averaging the acquired position data of the dynamic leading object near the current position of the ego vehicle when the dynamic leading object was located near the current position of the ego vehicle, wherein the average is a weighted average, and wherein acquired position data that is located closer to the current position of the ego vehicle is weighted higher than acquired position data that is located farther from the current position of the ego vehicle.

6. A method of identifying a current travel lane for an ego vehicle traveling on a road, the method comprising:
detecting a dynamic leading object in an external environment of the ego vehicle;
acquiring position data of the dynamic leading object over time;
determining a current position of the ego vehicle;
determining whether the current position of the ego vehicle is at substantially the same longitudinal position as a previous position of the dynamic leading object based on the acquired position data of the dynamic leading object;
responsive to determining that the current position of the ego vehicle is at substantially the same longitudinal position as a previous position of the dynamic leading object, determining a lateral offset between the current position of the ego vehicle and the previous position of the dynamic leading object;
tracking the lateral offset between the ego vehicle and the dynamic leading object over time; and
determining whether the ego vehicle has crossed a travel lane based at least in part on the determined lateral offset between the ego vehicle and the dynamic leading object over time.

7. The method of claim 6, further including:
if it is undetermined as to whether the ego vehicle has crossed a travel lane based at least in part on the determined lateral offset between the ego vehicle and the dynamic leading object over time, determining whether the ego vehicle has crossed a travel lane based on at least one additional factor, wherein the at least one additional factor includes at least one of: a detected turn signal of the dynamic leading object, GPS data of the ego vehicle, or yaw rate of the ego vehicle.

8. A method of identifying a current travel lane for an ego vehicle traveling on a road, the method comprising:
detecting a dynamic leading object in an external environment of the ego vehicle;
acquiring position data of the dynamic leading object over time;
determining a current position of the ego vehicle;
determining whether the current position of the ego vehicle is at substantially the same longitudinal position as a previous position of the dynamic leading object based on the acquired position data of the dynamic leading object;
responsive to determining that the current position of the ego vehicle is at substantially the same longitudinal position as a previous position of the dynamic leading object, determining a lateral offset between the current position of the ego vehicle and the previous position of the dynamic leading object; and
determining a probability that the ego vehicle is located in each travel lane of the road, wherein the determining a probability is based on a likelihood that the ego vehicle is located in each travel lane based on the determined lateral offset between the current position of the ego vehicle and the previous position of the dynamic leading object.

9. The method of claim 8, further including: adjusting the likelihood that the ego vehicle is located in each travel lane using a distance factor, wherein the distance factor has a greater effect on the likelihood if the distance between the ego vehicle and the dynamic leading object at the time the position data of the dynamic leading object was acquired is below a threshold, and wherein the distance factor has a reduced effect on the likelihood if the distance between the ego vehicle and the dynamic leading object at the time the position data of the dynamic leading object was acquired is above a threshold.

10. The method of claim 8, further including:
determining an alert based at least partially on the determined probability that the ego vehicle is located in each travel lane of the road; and
causing the alert to be presented to a driver of the ego vehicle.

11. A system for identifying a current travel lane for an ego vehicle on a road, the system comprising:
a sensor system including one or more sensors configured to:
acquire sensor data of an external environment of the ego vehicle; and
acquire position data of a dynamic leading objects in the external environment over time; and
a processor operatively connected to the sensor system, the processor being programmed to initiate executable operations comprising:
detecting a dynamic leading object in an external environment of the ego vehicle;
tracking a path of the dynamic leading object using acquired position data of the dynamic leading object acquired over time;
determining a current position of the ego vehicle;
determining a current reference frame of the ego vehicle;
transforming the acquired position data of the dynamic leading object based on the current position and the current reference frame of the ego vehicle;
determining whether the current position of the ego vehicle is at substantially the same longitudinal position as a previous position of the dynamic leading object based on the acquired position data of the dynamic leading object; and
responsive to determining that the current position of the ego vehicle is at substantially the same longitudinal position as a previous position of the dynamic leading object, determining a lateral offset between the current position of the ego vehicle and the previous position of the dynamic leading object using the transformed acquired position data.

12. The system of claim 11, wherein transforming the acquired position data of the dynamic leading object based on the current position and the current reference frame of the ego vehicle includes:
   translating the acquired position data of the dynamic leading object based on the current position of the ego vehicle; and
   rotating the acquired position data into the current reference frame of the ego vehicle.

13. The system of claim 11, wherein the executable operations further include:
   if there is no position data for the dynamic leading object at a current position of the ego vehicle, determining position data for the dynamic leading object at the current position of the ego vehicle using acquired position data of the dynamic leading object when the dynamic leading object was located near the current position of the ego vehicle.

14. The system of claim 13, wherein determining position data for the dynamic leading object at the current position of the ego vehicle using acquired position data of the dynamic leading object when the dynamic leading object was located near the current position of the ego vehicle includes:
   averaging the acquired position data of the dynamic leading object near the current position of the ego vehicle when the dynamic leading object was located near the current position of the ego vehicle, wherein the average is a weighted average, and wherein acquired position data that is located closer to the current position of the ego vehicle is weighted higher than acquired position data that is located farther from the current position of the ego vehicle.

15. A system for identifying a current travel lane for an ego vehicle on a road, the system comprising:
   a sensor system including one or more sensors configured to:
      acquire sensor data of an external environment of the ego vehicle; and
      acquire position data of a dynamic leading objects in the external environment over time; and
   a processor operatively connected to the sensor system, the processor being programmed to initiate executable operations comprising:
      detecting a dynamic leading object in an external environment of the ego vehicle;
      tracking a path of the dynamic leading object using acquired position data of the dynamic leading object acquired over time;
      determining a current position of the ego vehicle;
      determining whether the current position of the ego vehicle is at substantially the same longitudinal position as a previous position of the dynamic leading object based on the acquired position data of the dynamic leading object;
      responsive to determining that the current position of the ego vehicle is at substantially the same longitudinal position as a previous position of the dynamic leading object, determining a lateral offset between the current position of the ego vehicle and the previous position of the dynamic leading object; and
      tracking the lateral offset between the ego vehicle and the dynamic leading object over time; and
      determining whether the ego vehicle has crossed a travel lane based at least in part on the determined offset between the ego vehicle and the dynamic leading object over time.

16. The system of claim 15, wherein the executable operations further include:
   if it is undetermined whether the ego vehicle has crossed a travel lane based at least in part on the determined offset between the ego vehicle and the dynamic leading object over time, determining whether the ego vehicle has crossed a travel lane based on at least one additional factor, wherein the at least one additional factor includes at least one of: a detected turn signal of the dynamic leading object, GPS data of the ego vehicle, or yaw rate of the ego vehicle.

17. A system for identifying a current travel lane for an ego vehicle on a road, the system comprising:
   a sensor system including one or more sensors configured to:
      acquire sensor data of an external environment of the ego vehicle; and
      acquire position data of a dynamic leading objects in the external environment over time; and
   a processor operatively connected to the sensor system, the processor being programmed to initiate executable operations comprising:
      detecting a dynamic leading object in an external environment of the ego vehicle;
      tracking a path of the dynamic leading object using acquired position data of the dynamic leading object acquired over time;
      determining a current position of the ego vehicle;
      determining whether the current position of the ego vehicle is at substantially the same longitudinal position as a previous position of the dynamic leading object based on the acquired position data of the dynamic leading object;
      responsive to determining that the current position of the ego vehicle is at substantially the same longitudinal position as a previous position of the dynamic leading object, determining a lateral offset between the current position of the ego vehicle and the previous position of the dynamic leading object; and
      determining a probability that the ego vehicle is located in each travel lane of the road, wherein the determining a probability is based on a likelihood that the ego vehicle is located in each travel lane based on the determined lateral offset between the current position of the ego vehicle and the previous position of the dynamic leading object.

18. The system of claim 17, wherein the executable operations further include:
   adjusting the likelihood that the ego vehicle is located in each travel lane using a distance factor, wherein the distance factor has a greater effect on the likelihood if the distance between the ego vehicle and the dynamic leading object at the time the position data of the dynamic leading object was acquired is below a threshold, and wherein the distance factor has a reduced effect on the likelihood if the distance between the ego vehicle and the dynamic leading object at the time the position data of the dynamic leading object was acquired is above a threshold.

19. A method of identifying a travel lane for an ego vehicle traveling on a road, the method comprising:
   acquiring position data of a dynamic surrounding object in an external environment of the ego vehicle over time;
   determining whether a position of the ego vehicle at a first moment in time is at substantially the same longitudinal position as a position of the dynamic surrounding object at a second moment in time based at least in part on the acquired position data of the dynamic surrounding object, the first moment in time and the second moment in time being different;
transforming the acquired position data of the dynamic surrounding object based on the position of the ego vehicle at the first moment in time and a reference frame of the ego vehicle at the first moment in time; and
responsive to determining that the position of the ego vehicle at a first moment in time is at substantially the same longitudinal position as a position of the dynamic surrounding object at a second moment in time, determining a lateral offset between the position of the ego vehicle and the position of the dynamic surrounding object using the transformed acquired position data.

20. The method of claim 19, further including:
determining a current travel lane of the ego vehicle based at least partially on the determined lateral offset, whereby lane identification is performed without road curvature data.

21. The method of claim 19, wherein the method is at least one of performed entirely on the ego vehicle, performed entirely on a server remote from the ego vehicle, and performed partially on the ego vehicle and partially on the server.

22. The method of claim 19, wherein the dynamic surrounding object is a dynamic leading object.

23. The method of claim 19, wherein transforming the acquired position data of the dynamic surrounding object based on the position of the ego vehicle at the first moment in time and the reference frame of the ego vehicle at the first moment in time includes:
translating the acquired position data of the dynamic surrounding object based on the position of the ego vehicle at the first moment in time; and
rotating the acquired position data into the reference frame of the ego vehicle at the first moment in time.

24. A method of identifying a travel lane for an ego vehicle traveling on a road, the method comprising:
acquiring position data of a dynamic surrounding object in an external environment of the ego vehicle over time;
determining whether a position of the ego vehicle at a first moment in time is at substantially the same longitudinal position as a position of the dynamic surrounding object at a second moment in time based at least in part on the acquired position data of the dynamic surrounding object, the first moment in time and the second moment in time being different;
responsive to determining that the position of the ego vehicle at a first moment in time is at substantially the same longitudinal position as a position of the dynamic surrounding object at a second moment in time, determining a lateral offset between the position of the ego vehicle and the position of the dynamic surrounding object;
tracking the lateral offset between the ego vehicle and the dynamic surrounding object over time; and
determining whether the ego vehicle has crossed a travel lane based at least in part on the determined offset between the ego vehicle and the dynamic surrounding object over time.

25. A method of identifying a travel lane for an ego vehicle traveling on a road, the method comprising:
acquiring position data of a dynamic surrounding object in an external environment of the ego vehicle over time;
determining whether a position of the ego vehicle at a first moment in time is at substantially the same longitudinal position as a position of the dynamic surrounding object at a second moment in time based at least in part on the acquired position data of the dynamic surrounding object, the first moment in time and the second moment in time being different;
responsive to determining that the position of the ego vehicle at the first moment in time is at substantially the same longitudinal position as a position of the dynamic surrounding object at the second moment in time, determining a lateral offset between the position of the ego vehicle at the first moment in time and the position of the dynamic surrounding object at the second moment in time; and
determining a probability that the ego vehicle is located in each travel lane of the road, wherein the determining a probability is based on a likelihood that the ego vehicle is located in each travel lane based on the determined lateral offset between the position of the ego vehicle at the first moment in time and the position of the dynamic surrounding object at the second moment in time.

\* \* \* \* \*